(12) United States Patent
Ford

(10) Patent No.: US 11,416,599 B2
(45) Date of Patent: Aug. 16, 2022

(54) METHOD AND SYSTEM FOR DISTINGUISHING HUMAN USERS FROM AUTOMATED AGENTS IN A COMPUTING ENVIRONMENT

(71) Applicant: Arkose Labs Holdings, Inc., San Francisco, CA (US)

(72) Inventor: Matthew Michael Ford, Brisbane (AU)

(73) Assignee: Arkose Labs Holdings, Inc., San Mateo, CA (US)

( * ) Notice: Subject to any disclaimer, the term of this patent is extended or adjusted under 35 U.S.C. 154(b) by 15 days.

(21) Appl. No.: 16/494,088

(22) PCT Filed: Mar. 16, 2018

(86) PCT No.: PCT/AU2018/050244
§ 371 (c)(1),
(2) Date: Sep. 13, 2019

(87) PCT Pub. No.: WO2018/165719
PCT Pub. Date: Sep. 20, 2018

(65) Prior Publication Data
US 2020/0134159 A1 Apr. 30, 2020

(30) Foreign Application Priority Data

Mar. 17, 2017 (AU) .............. 2017900942

(51) Int. Cl.
*G06F 21/00* (2013.01)
*G06F 21/36* (2013.01)
*G06F 21/46* (2013.01)

(52) U.S. Cl.
CPC .............. *G06F 21/36* (2013.01); *G06F 21/46* (2013.01); *G06F 2221/2103* (2013.01); *G06F 2221/2133* (2013.01)

(58) Field of Classification Search
CPC .. G06F 21/36; G06F 21/46; G06F 2221/2103; G06F 2221/2133; G06F 21/31
See application file for complete search history.

(56) References Cited

U.S. PATENT DOCUMENTS 7,891,005 B1 2/2011 Baluja et al.
8,196,198 B1 6/2012 Eger
(Continued)

FOREIGN PATENT DOCUMENTS

EP 2410450 A1 1/2012

OTHER PUBLICATIONS

Kim, J., et al., 'Automated Collection of High Quality 30 Avatar Images', Proceedings of the Twenty-third Midwest Artificial Intelligence and Cognitive Science Conference, 2012, pp. 78-82 [retrieved from the internet Jun. 15, 2018] <URL: <http://ceur-ws.org/Vol-> 841/MAICS20 I 2Proceedings.pdf> see, for example, the abstract, p. 78 column 2 lines 17-26, p. 79 column 1 lines 4-12, p. 81 column 1 lines 17-19 and 31-38.
(Continued)

*Primary Examiner* — Jeffrey C Pwu
*Assistant Examiner* — William A Corum, Jr.
(74) *Attorney, Agent, or Firm* — Womble Bond Dickinson (US) LLP

(57) ABSTRACT

A method enables website providers to prohibit non-human users, such as programmed agents, from viewing their websites. According to a method for user authentication according to an embodiment, an authentication challenge is generated by a computing device, the authentication challenge including a number of challenge elements. The authentication challenge is presented to a user of a computing device and the user responds to the authentication challenge by selecting one or more challenge elements in accordance with an instruction provided to the user on how (Continued)

to complete the authentication challenge. The user is then notified whether they have successfully chosen the correct challenge element/s.

20 Claims, 15 Drawing Sheets

(56) References Cited

U.S. PATENT DOCUMENTS

| | | | | |
|---|---|---|---|---|
| 8,621,396 | B1* | 12/2013 | Gossweiler, III | G06F 21/36 715/863 |
| 8,978,121 | B2 | 3/2015 | Shuster | |
| 8,990,959 | B2* | 3/2015 | Zhu | G06F 21/36 726/29 |
| 9,547,763 | B1* | 1/2017 | Avital | G06F 21/36 |
| 2010/0031287 | A1* | 2/2010 | Simon | H04N 21/234318 725/38 |
| 2010/0325706 | A1* | 12/2010 | Hachey | G06F 21/36 726/6 |
| 2011/0208716 | A1 | 8/2011 | Liu et al. | |
| 2011/0292031 | A1* | 12/2011 | Zhu | G06F 21/36 345/419 |
| 2012/0246737 | A1 | 9/2012 | Paxton et al. | |
| 2015/0317700 | A1 | 11/2015 | Ford et al. | |
| 2015/0319153 | A1* | 11/2015 | Tartz | H04L 63/08 726/4 |
| 2016/0094724 | A1* | 3/2016 | Lemchak | H04M 15/8094 455/414.1 |
| 2017/0262623 | A1* | 9/2017 | Plenderleith | G06F 21/36 |
| 2018/0189471 | A1* | 7/2018 | Paluri | G06F 21/36 |

OTHER PUBLICATIONS

D'Souza. D. et al., 'Avatar CAPTCHA: Telling Computers and Humans Apart via Face Classification', 2012 IEEE International Conference on Electro/Information Technology, DOI: IO. 1109/EIT. 2012.6220734 see, for example, the abstract, section III. Architecture, section IV. Experiment and figure 5.

International Search report for the related application No. PCT/AU2018/050244 dated Jun. 25, 2018.

* cited by examiner

METHOD AND SYSTEM FOR DISTINGUISHING HUMAN USERS FROM AUTOMATED AGENTS IN A COMPUTING ENVIRONMENT

TECHNICAL FIELD

This disclosure relates generally to a method and system for human user authentication, and in particular to presenting authentication challenges for distinguishing human users of a computing system from automated agents.

BACKGROUND

Authentication programs are commonly used to ensure that information entered into a computer, such as via a web site, is entered by a human user of a computing device rather than by an automated program commonly known as a tot or an 'agent'.

Agents are commonly used by computer hackers in order to gain illicit entry to web sites, or to cause malicious damage, for example by creating a large amount of data in order to cause a computer system to crash, by creating a large number of fictitious membership accounts in order to send spam, by skewing results of a vote or poll, by entering a contest many times, or by guessing a password or decryption key through a method known as "brute force".

One example of such a user authentication program presents a string of random characters to a user, and in response the user enters the presented characters. If the user enters the characters correctly, the user is allowed to proceed.

However, agents have adapted to include character recognition in order to circumvent such authentication programs. In response, authentication programs such as CAPTCHA ("Completely Automated Public Turing test to tell Computers and Humans Apart") programs have been developed to disguise test characters, for example by adding background noise, or randomly positioning the characters on the screen, rather than in pre-defined rows. Although such programs are successful at preventing some agents from accessing a computer, it also can be difficult for human users to read such disguised characters. As such, character-based CAPTCHA authentication programs often can be frustrating and tedious to use.

Also, such authentication programs can be bypassed by somewhat sophisticated agents which can determine the answer despite the disguise. As such, character-based CAPTCHA authentication programs often fail to prevent automated abuse of the protected computer system.

Another example of such a user authentication program presents a grid of photographs to a user, and in response the user selects one or more photographs which meet a stated criterion such as "Select pictures that contain construction vehicles".

However, although such programs are successful at preventing some agents from accessing a computer, it also can be difficult for human users to decide whether the instruction applies or does not apply to photographs with ambiguous contents, such as whether a consumer-grade Sports Utility Vehicle should be regarded as a construction vehicle. As such, photo-based CAPTCHA authentication programs often can be frustrating and tedious to use.

Also, such authentication programs can be bypassed by somewhat sophisticated agents which can automatically recognize the contents of photographs. As such, photo-based CAPTCHA authentication programs often fail to prevent automated abuse of the protected computer system.

An authentication system which can be bypassed by a merely somewhat sophisticated agent motivates computer hackers to invest a small amount of labour to create such an agent, provided that the reward for bypassing the authentication system is greater than the investment that must be made to create the agent.

However, an authentication system which can only be bypassed by a highly sophisticated agent demotivates computer hackers to invest the large amount of labour to create such an agent, provided that the reward for bypassing the authentication system is smaller than the investment that must be made to create the agent.

There is therefore a need for an improved method and system for user authentication that is both easy for human users to pass without frustration and tedium, and very difficult for agents to pass, except for those agents which require the investment of so much labour to create that the resulting reward is less than the investment made.

The reference to any prior art in this specification is not, and should not be taken as, an acknowledgement or any form of suggestion that the prior art forms part of the common general knowledge in Australia or elsewhere.

SUMMARY

In one form, although not necessarily the only or broadest form, the disclosure resides in a method for user authentication, including:

presenting an authentication challenge to a user of a computing device, the authentication challenge including a number of challenge elements;

receiving a response to the authentication challenge from the user, the response including a selection of one or more challenge elements in accordance with an instruction to the user on how to complete the authentication challenge;

wherein the challenge element that complies with the instruction contains a moving image that portrays one or more objects obeying the laws of gravity; and notifying the user whether the user's choice of challenge element correctly complied with the instruction; and if the user has correctly complied with the instruction, allowing the user to perform a computer operation.

In one embodiment, a moving image comprising a correct response portrays one or more common objects, for example rook pieces from the game of Chess, falling from the top of the element's visible area to the bottom of the element's visible area, in a realistic depiction of what those objects would look like in the real world if they were falling in that manner, and a moving image comprising an incorrect response portrays one or more common objects, for example rook pieces from the game of Chess, falling in a direction that proceeds from a point other than the top of the element's visible area to a point other than the bottom of the element's visible area. It will be appreciated that many other possible common objects can be depicted that also could appear to be falling.

In another form, although not necessarily the only or broadest form, the disclosure resides in a method for user authentication, including:

presenting an authentication challenge to a user of a computing device, the authentication challenge including a number of challenge elements;

receiving a response to the authentication challenge from the user, the response including a selection of one or more challenge elements in accordance with an instruction to the user on how to complete the authentication challenge;

wherein the challenge element that complies with the instruction contains an image portraying an object that appears to be orientated upright; and notifying the user whether the user's choice of challenge element correctly complied with the instruction or not; and if the user correctly complied with the instruction, allowing the user to perform a computer operation.

In one embodiment, an object portrayed in the challenge element is a familiar object, for example an animal or household item or human figure, and an image comprising a correct response portrays the object in an upright position, for example an animal standing upright, and an image comprising an incorrect response portrays the object in a position other than upright, for example an animal in a standing pose that is not upright, such as with the legs pointing to the side or upward.

In another embodiment, an element that complies with the instruction portrays multiple images in a stack, so that each image overlays another image so that the images are overlapping. In some examples, the instruction asks for the image that appears to be on top of the stack to be properly oriented in an upright position, and an object portrayed in an image that is on the front-most layer of the stack appears to be in an upright position, for example an animal standing upright. In further examples, images that are not on the front-most layer of the stack do not appear to be in an upright position.

In another form, although not necessarily the only or broadest form, the disclosure resides in a method for user authentication, including:

presenting an authentication challenge to a user of a computing device, the authentication challenge including a number of challenge elements;

receiving a response to the authentication challenge from the user, the response including a selection of one or more challenge elements in accordance with an instruction to the user on how to complete the authentication challenge;

wherein the challenge element that complies with the instruction is an image that both has a visual property and is positioned relative to a second image with a visual property;

notifying the user whether the user's choice of challenge element correctly complied with the instruction or not; and if the user correctly complied with the instruction, allowing the user to perform a computer operation.

In one embodiment, the challenge instruction includes a reference to a shape, for example a sphere, cone, or cube, and the challenge element comprising a correct response portrays the shape named in the instruction, and some images comprising incorrect responses are a shape different from the shape named in the instruction.

In another embodiment, the challenge instruction includes a reference to a material, for example "speckled", "furry", or "striped", and the challenge element comprising a correct response appears to be an object made of the material named in the instruction, and some challenge elements comprising incorrect responses appear to be objects made of material different from the material named in the instruction. In some examples, the appearance of each object is altered by the application of one of many possible virtual textures that is applied to the three-dimensional mesh of the object. In some examples, a human would regard the texture or colour of at least one of the objects as conforming to the description in the instruction. It will be appreciated that this multiplicity of textures will further increase the amount of human labor that must be expended to construct an agent that can correctly identify this multiplicity of textures.

In another embodiment, the challenge instruction includes a reference to a relative size property, for example "largest", "tallest", or "flattest", and the challenge element comprising a correct response has the property named in the instruction as compared to the other visible images, and some challenge element comprising incorrect responses do not have the property named in the instruction as compared to the other visible challenge elements.

In another embodiment, the challenge instruction includes a position relative to another image, for example "to the right of", "behind", or "over", and the challenge element comprising a correct response is in the position named in the instruction as compared to a challenge element described in another part of the instruction, and some challenge elements comprising incorrect responses are not in the position named in the instruction compared to a challenge element described in another part of the instruction.

In another form, although not necessarily the only or broadest form, the disclosure resides in a method for user authentication, including:

presenting an authentication challenge to a user of a computing device, the authentication challenge including a number of challenge elements;

receiving a response to the authentication challenge from the user, the response including a selection of one or more challenge elements in accordance with an instruction to the user on how to complete the authentication challenge;

wherein the challenge element that complies with the instruction portrays a particular object which is moving through an area crowded with other objects, and at times these objects occlude or are occluded by each other, and at times these objects appear to move into and out of areas of different light intensity;

notifying the user whether the user's choice of challenge element correctly complied with the instruction or not; and if the user correctly complied with the instruction, allowing the user to perform a computer operation.

In one embodiment, as part of the moving image, a challenge element comprising a correct response portrays an animal, for example a deer, walking through a thickly populated natural area, for example a forest or jungle, in which the deer appears to pass in front of and behind and under objects populating the area, for example rocks, trees, vines, bushes, and other creatures, and the deer appears to pass through shadows cast by an overhead sun shining on the objects populating the area, while as part of the moving image, challenge elements comprising incorrect responses portray other object populating the area, for example rocks, trees, vines, bushes, and other creatures. In this case, a human would find it easy to keep attention focused on the deer's most likely position at times when the deer is not clearly visible, and resume attention on the deer when it becomes clearly visible again. It will be appreciated that it would require a large amount of human labor to construct an agent that is capable of continually identifying the deer in this case. It will be appreciated that many different moving images can be produced by making the challenge elements portray many different kinds of animals besides a deer, and many different kinds of objects.

In another form, although not necessarily the only or broadest form, the disclosure resides in a method for user authentication, including:

presenting an authentication challenge to a user of a computing device, the authentication challenge including a number of challenge elements;

receiving a response to the authentication challenge from the user, the response including a selection of one or more challenge elements in accordance with an instruction to the user on how to complete the authentication challenge;

wherein the challenge element that complies with the instruction is a moving image that portrays one or more avatars and wherein at least one avatar is performing a predetermined activity;

notifying the user whether the user's choice of challenge element correctly complied with the instruction or not; and if the user correctly complied with the instruction, allowing the user to perform a computer operation.

In one embodiment, as part of the moving image, a challenge element comprising a correct response portrays the person performing the predetermined activity of committing an action which commonly is regarded in criminal law as illegal, for example stealing an object, assaulting another person or animal, vandalising property, shoving a person, tripping a person, or blocking the flow of traffic, and as part of the moving image, challenge elements comprising an incorrect responses portray objects which are not the person in the moment of committing the criminal act, for example cars, rubbish bins, animals, sidewalks, streets, signs, benches, doors, and people who are committing no crime at the moment of selection.

In some examples, each element in the moving image is rendered from a three-dimensional virtual object, and some of the features of each three-dimensional virtual object are altered by one of a plurality of animations of the three-dimensional virtual object in a way so the object's polygonal mesh is distorted over time.

In some examples, a human would regard the animation of at least one of the objects as conforming to the description in the instruction during at least one moment in time. It will be appreciated that this multiplicity of animations will further increase the amount of human labor that must be expended to construct an agent that can examine the moving image and determine that the animations of the objects within the image fit the conditions described in the instruction. It will be appreciated that a large amount of human labor must be expended to construct an agent that can examine the moving image and determine that the animations performed by the objects within the moving image fit the conditions described in the instruction. It will be appreciated that an authentication server can determine whether the response is correct by virtue of the authentication server having composed the image and kept a record of which images were placed in which locations of the moving image, and that this can be done by a secondary render made of the three-dimensional virtual objects in which textures of a three dimensional virtual object associated with a correct response, at the moment that the response is correct, is replaced with a texture that has a single key colour, and textures of all other three dimensional virtual objects at all other times are replaced with textures that are not this key colour, so that the key-coloured render produced shows the key colour in the pixels associated with the points in the moving image that would constitute a correct response, and this key-coloured render is used by the authentication server as a map to assess the response of the user.

In another form, although not necessarily the only or broadest form, the disclosure resides in a method for user authentication, including:

presenting an authentication challenge to a user of a computing device, the authentication challenge including a number of challenge elements;

receiving a response to the authentication challenge from the user, the response including a selection of one or more challenge elements in accordance with an instruction to the user on how to complete the authentication challenge;

wherein the challenge element that complies with the instruction is an image that depicts an object, that object also depicted in the form of a static or animated plurality of dots, in which the animated plurality of dots alternates between a shape resembling the object and a randomised arrangement; and notifying the user whether the user's choice of challenge element correctly complied with the instruction or not;

if the user correctly complied with the instruction, allowing the user to perform a computer operation.

In one embodiment, an image comprising a correct response portrays an object in a clear, realistic form, for example a realistic picture of a dog, and the plurality of dots has the general shape of the outline and major internal features of the clear image, for example a plurality of dots filling an invisible outline conforming to the shape of a dog, with dots along invisible lines and areas conforming to the dog's eyes, tongue, and collar; and an image comprising an incorrect response portrays an object in a clear, realistic form, for example a realistic picture of a tree, and the plurality of dots does not have the general shape of the outline and major internal features of the clear image.

In another embodiment, the plurality of dots is an animated image in which the overall form of the object, for example a dog, remains detectable while the individual dots making up the image are in constant random motion.

In another embodiment, a primary plurality of dots pertaining to the correct response is overlaid with a secondary plurality of dots, the dots in both pluralities being the same size and shape, and the primary plurality moving back and forth at a speed faster than the secondary plurality, so that perception of the parallax effect makes the primary plurality appear to be in front of, and distinguishable from, the secondary plurality.

In another form, although not necessarily the only or broadest form, the disclosure resides in a method for user authentication, including:

presenting an authentication challenge to a user of a computing device, the authentication challenge including a number of challenge elements;

receiving a response to the authentication challenge from the user, the response including a selection of one or more challenge elements in accordance with an instruction to the user on how to complete the authentication challenge;

wherein the element that complies with the instruction is a moving image that portrays one or more objects interacting with each other in violation of a law of physics;

notifying the user whether the user's choice of challenge element correctly complied with the instruction or not; and if the user correctly complied with the instruction, allowing the user to perform a computer operation.

In one embodiment, a moving image comprising a correct response portrays one or more common objects colliding with one another and reacting in a way violating laws of physics of conservation of momentum, for example a small ball rolling across a table, striking a large stationary ball on the table, and the large ball moving a great distance while the small ball continues moving at the same speed and direction it was moving before the collision, and a moving image comprising an incorrect response portrays one or more common objects colliding with one another and reacting in a way conforming with laws of physics of conservation of momentum, for example a small ball rolling across a table, striking a large stationary ball on the table, and the large ball moving a small distance while the small ball rebounds and moves a larger distance.

In another embodiment, a moving image comprising a correct response portrays one or more common objects violating laws of physics that pertain to how falling objects rebound off a floor, for example a ball falling down from a small height, striking a table, and bouncing back up to a greater height than the ball fell from while going in a direction that does not reflect the angle at which the ball fell towards the table, and a moving image comprising an incorrect response portrays one or more common objects conforming with laws of physics that pertain to how falling objects rebound off a floor, for example a ball falling down, striking a table, and bouncing back up to a smaller height than the ball fell from.

In another embodiment, a moving image comprising a correct response portrays one or more common objects violating laws of physics that pertain to entropy, for example the shattered pieces of a teapot on a table rising up and assembling into a teapot, and a moving image comprising an incorrect response portrays one or more common objects conforming to laws of physics that pertain to entropy, for example a teapot breaking apart into pieces which scatter across the table.

In another embodiment, a moving image comprising a correct response portrays one or more common objects not conforming with laws of physics that pertain to persistence of existence, for example a ball rolling on a table until it is behind a barrier blocking it from view, then the barrier being lifted off the table by a hand, revealing the ball is no longer there, or has been replaced by a cube, and a moving image comprising an incorrect response portrays one or more common objects conforming to laws of physics that pertain to persistence of existence, for example a ball rolling on a table until it is behind a barrier blocking it from view, then the barrier being lifted off the table by a hand, revealing the ball is still there.

In another form, although not necessarily the only or broadest form, the disclosure resides in a method for user authentication, including:

presenting an authentication challenge to a user of a computing device, the authentication challenge including a number of challenge elements;

receiving a response to the authentication challenge from the user, the response including a selection of one or more challenge elements in accordance with an instruction to the user on how to complete the authentication challenge;

wherein the authentication challenge includes a reference image displaying an object and wherein the challenge element that complies with the instruction portrays the object in an image wherein the object is the object in the reference image that has been rotated in a three-dimensional space;

notifying the user whether the user's choice of challenge element correctly complied with the instruction or not; and if the user correctly complied with the instruction, allowing the user to perform a computer operation.

In one embodiment, an image comprising a reference image portrays a solid object, for example a dachshund dog as viewed from a virtual camera pointing toward the side of the dog, and a challenge element comprising a correct response portrays an object that is the same as the object in the reference image, but viewed from a different angle transformed through three-dimensional space, for example a dachshund dog as viewed from a virtual camera above the dog and pointing down at the back of the dog, and a challenge element comprising an incorrect response portrays an object that is not the same as the object in the reference image, for example a poodle dog.

In another form, although not necessarily the only or broadest form, the disclosure resides in a method for user authentication, including:

presenting an authentication challenge to a user of a computing device, the authentication challenge including a number of challenge elements;

receiving a response to the authentication challenge from the user, the response including a selection of one or more challenge elements in accordance with an instruction to the user on how to complete the authentication challenge;

wherein the challenge element that complies with the instruction is an image that portrays a face that appears to be looking at a virtual camera which is capturing the face;

notifying the user whether the user's choice of challenge element correctly complied with the instruction or not; and if the user correctly complied with the instruction, allowing the user to perform a computer operation.

In one embodiment, a challenge element comprising a correct response portrays a face that appears to be looking at a virtual camera from which the image was rendered, and challenge elements comprising incorrect responses portray one or more faces that appear to be looking in a direction other than towards the virtual camera from which the image was rendered.

In another form, although not necessarily the only or broadest form, the disclosure resides in a method for user authentication, including:

presenting an authentication challenge to a user of a computing device, the authentication challenge including a number of challenge elements;

receiving a response to the authentication challenge from the user, the response including a selection of one or more challenge elements in accordance with an instruction to the user on how to complete the authentication challenge;

wherein the challenge element that complies with the instruction is a simulated image of a class of natural phenomenon, the image one which scientists cannot classify by automated means, the image one which a human can classify with the human's innate skills;

notifying the user whether the user's choice of challenge element correctly complied with the instruction or not; and if the user correctly complied with the instruction, allowing the user to perform a computer operation.

In one embodiment, a reference image accompanies an instruction to select an image that portrays the same phenomenon shown in the reference image, and a framing image contains multiple challenge elements within it, and, within the framing image, a challenge element comprising a correct response portrays, by means of visual simulation, a natural phenomenon, such a polygonal ridge network on the surface of Mars, and, within the framing image, a challenge element comprising an incorrect response portrays, by means of visual simulation, a natural phenomenon, such a feature on the surface of Mars that is not a polygonal ridge network.

In some examples, a time to complete the authentication challenge is limited and predefined.

In some examples, a plurality of authentication challenges is presented to the user, each authentication challenge being presented in sequence.

In some examples, one or more of the challenge elements are associated with a correct response to the challenge instruction. In additional examples, one or more of the challenge elements are associated with an incorrect response to the challenge instruction. In further examples, one of the challenge elements is associated with a correct response to the challenge instruction, and a plurality of the challenge elements are associated with an incorrect response to the challenge question.

In some examples, the challenge elements include one of a plurality of visual components, a plurality of audio components, and a plurality of audio-visual components.

In some examples, the challenge elements include a plurality of visual components in the form of challenge images. In additional examples, the challenge images include a number of distinct images. In another embodiment, the challenge images include a single image with distinct images visible within the single image.

In some examples, the challenge images are configured in a spatial arrangement formed at least in part by the plurality of challenge images.

In some examples, multiple challenge elements are composed into a single unified framing image. In additional examples, a composition program uses a virtual camera to render the framing image from a virtual three dimensional scene, and the scene contains multiple three dimensional virtual objects, each of which depicts one of the multiple challenge elements.

In some examples, the selection of one point on the surface of the framing image designates one and only one of the challenge elements. In additional examples, a plurality of framing images are composed into a digital animated sequence that shows the multiple challenge elements moving and changing within the digital animated sequence.

In some examples, at least one of the challenge images is associated with a correct response to the challenge instruction. In additional examples, at least one of the challenge images is associated with an incorrect response to the challenge instruction. In further examples, one of the images is associated with a correct response to the challenge instruction, and a plurality of the images are associated with an incorrect response to the challenge instruction.

In some examples, the challenge instruction includes a direction for the user to interact with one or more of the challenge elements.

In some examples, the challenge instruction includes a direction for the user to move one or more of the challenge elements in such a way to make the element go up, down, left, right, in, out, or to rotate around an axis.

In some examples, the challenge instruction includes a direction for the user to select or manipulate one or more of the challenge elements.

In another embodiment, the challenge images are presented one at a time, and the user changes which challenge image to evaluate by performing an operation which appears to rotate a challenge image. In additional examples, after performing this operation, each successive challenge image displayed is visually consistent with the act of rotating the previous image to produce the next image.

In some examples, at least one of the challenge images is associated with a correct response to the challenge instruction. In additional examples, at least one of the challenge images is associated with an incorrect response to the challenge instruction. In further examples, one of the images is associated with a correct response to the challenge instruction, and a plurality of the images are associated with an incorrect response to the challenge instruction.

In some examples, the challenge instruction includes a direction for the user to select one or more of the challenge elements.

In some examples, the challenge instruction includes a direction for the user to rotate one or more of the challenge elements.

In some examples, the computing device of the user is not also the computing device that receives the response to the authentication challenge.

In some examples, the authentication challenge is encrypted before being sent to the user.

In some examples, the challenge elements are encrypted before being sent to the user.

In some examples, the authentication challenge is decrypted before being presented to the user.

In some examples, the challenge elements are decrypted before being presented to the user.

In some examples, if a time between sending a key to decrypt the encrypted challenge elements and receiving the response to the authentication challenge is longer than a pre-determined time, the response to the authentication challenge is determined to be an incorrect response.

In some examples, the response to the authentication challenge is accompanied by a report of the URL of the web page on which the challenge was answered, and if this URL does not reside in a list of acceptable URLs stored on the authentication server, the response to the authentication challenge is determined to be an incorrect response.

In some examples, in the case of a challenge element that contains two dimensional challenge images, each of the challenge images may be created from a different aspect of a virtual three dimensional object, using a virtual camera to view the three dimensional object in a variety of conditions to create each two dimensional challenge image. In additional examples, the position and direction of the virtual camera changes to create each challenge image. In further examples, some of the features of the model challenge images may be altered by movement of the three dimensional object and the virtual lights that illuminate the three dimensional object.

In some examples, a computing device can compose the challenge element by rendering the virtual three dimensional objects into two dimensional graphic elements, store these elements, and at a later time layer randomly chosen two dimensional graphic elements together to create the challenge element. The challenge element is sent to the user's computing device, the effect being that it would require a large amount of labour to program an agent to distinguish various overlapping two dimensional graphic elements from each other.

In some examples, the challenge element is a digital animated visual sequence composed of multiple two-dimensional challenge elements, each element being a frame in the sequence.

In some examples, in the case of challenge elements that contain a moving image, the virtual lights illuminating the three dimensional object are such a zone of light passes over an object that otherwise is completely dark, portrayed against a completely dark background, so that the whole object is never fully revealed in any one moment during the moving image. In further examples, such alterations are done in a way to make it highly labor intensive to program or train an agent to recognise that two different moving images were rendered from two different virtual three-dimensional scenes that both contained the same three-dimensional object.

In some examples, in the case of challenge elements that contain two dimensional challenge images, each of the challenge images is subjected to random distortions which result in an image that a human would regard as basically unchanged, but require a large amount of labour to program or train an agent to recognize the similarity between the original image and the distorted image.

In some examples, in the case of challenge elements that contain three dimensional virtual polygon meshes, each of the meshes is subjected to random distortions which result in an image that a human would regard as basically unchanged, but require a large amount of labour to program or train an agent to recognize the similarity between the original image and the distorted image. In additional examples, a stream of successive instructions will change a three-dimensional mesh of polygons to result in a moving image. In additional examples, the authentication server 210 may construct the mesh from multiple elements and algorithms stored on the server, and apply random changes to the mesh, resulting in a mesh that is sent to the client device 220, and the client device displays that mesh to the user by use of a program that produces a virtual visual output in a two-dimensional or three-dimensional form.

In another form, the disclosure resides in a system for user authentication, including an authentication server, the authentication server including a processor coupled to a memory, the memory including program code instructions configured to cause the processor to:

present an authentication challenge to a user of a computing device, the authentication challenge including a number of challenge elements;

receive a response to the authentication challenge from the user, the response including a selection of one or more challenge elements in accordance with an instruction to the user on how to complete the authentication challenge;

notify the user whether the user's choice of challenge element correctly complied with the instruction or not; and if the user correctly complied with the instruction, allow the user to perform a computer operation.

In another form, the disclosure resides in a computing device for user authentication, including a processor coupled to a memory, the memory including program code instructions configured to cause the processor to:

present an authentication challenge to a user of a computing device, the authentication challenge including a number of challenge elements;

receive a response to the authentication challenge from the user, the response including a selection of one or more challenge elements in accordance with an instruction to the user on how to complete the authentication challenge;

notify the user whether the user's choice of challenge element correctly complied with the instruction or not; and if and only if the users correctly complied with the instruction, allow the user to perform a computer operation.

BRIEF DESCRIPTION OF THE DRAWINGS

Embodiments of the disclosure will be described with reference to the accompanying drawings in which.

DETAILED DESCRIPTION OF THE PREFERRED EMBODIMENT

Figure 1:
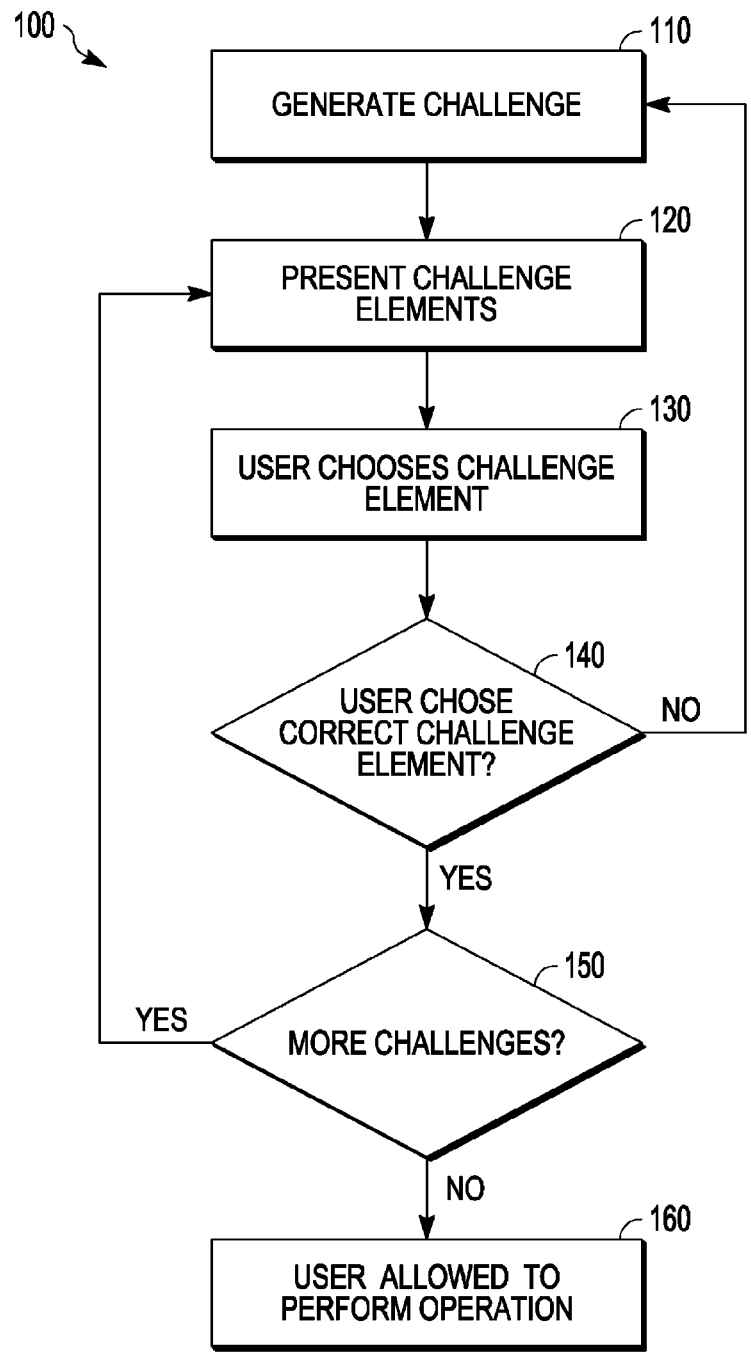
FIG. 1 illustrates a flow chart of a method for human user authentication according to an embodiment of the present disclosure.

Elements of the disclosure are illustrated in concise outline form in the drawings, showing only those specific details that are necessary to understanding the embodiments of the present disclosure, but so as not to clutter the disclosure with excessive detail that will be obvious to those of ordinary skill in the art in light of the present description.

In this patent specification, adjectives such as first and second, left and right, front and back, top and bottom, etc., are used solely to define one element from another element without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present disclosure. It will be appreciated that the disclosure may be implemented in a variety of ways, and that this description is given by way of example only.

FIG. 1 illustrates a block diagram of a method 100 for user authentication according to an embodiment of the present disclosure. At step 110, an authentication challenge is generated by a computing device, the authentication challenge including a number of challenge elements. At step 120, an authentication challenge is presented to a user of a computing device, the authentication challenge including a number of challenge elements. At step 130, the user responds to the authentication challenge by selecting one or more challenge elements in accordance with an instruction provided to the user on how to complete the authentication challenge. At step 140, the user is notified whether they have successfully chosen the correct challenge element/s. If an incorrect response was provided, the method 100 returns to step 110. If a correct response was provided, at optional step 150, the computing device determines whether further authentication challenges will be completed. If yes, the method 100 returns to step 120. If no, the method 100 advances to step 160 allowing the user to perform a computer operation.

Embodiments of the present disclosure enable website providers to prohibit non-human users, such as programmed agents, from viewing their websites. This also prevents websites providers from having to pay unnecessary costs associated with agents viewing their websites.

In addition to protecting websites, embodiments of the present disclosure also can be applied, for example, to smartphone applications, API interfaces, and as a preliminary interface to prevent programmed agents from gaining unwanted access to devices.

Figure 2:
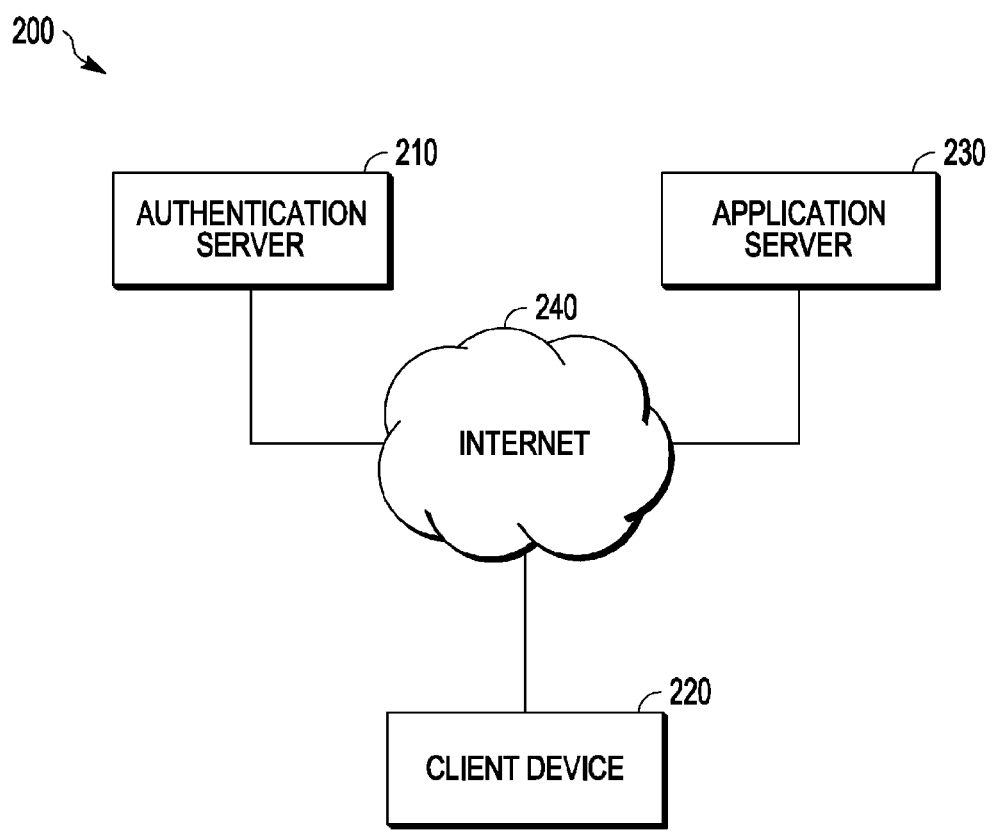
FIG. 2 illustrates a block diagram of a system for human user authentication according to an embodiment of the present disclosure.

FIG. 2 illustrates a block diagram of a system 200 for user authentication according to an embodiment of the present disclosure. The system 200 includes an authentication server 210, a client device 220, and an application server 230, each in communication via the Internet 240. In one embodiment, the method 100 of FIG. 2 is performed on the authentication server 210. The authentication server 210 includes a processor coupled to a memory, and the memory includes program code components configured to cause the processor to perform the method of the present disclosure. In another embodiment, the client device 220 communicates with application server 230, and application server 230 directs client device 220 to perform the method 100 of FIG. on the authentication server 210.

According to some embodiments, each authentication challenge is relatively easy for humans to perform but generally can be bypassed only by a highly sophisticated agent created through a large amount of labour, and some examples are provided below. However it should be appreciated that the examples do not represent all possible scenarios.

Figure 3:
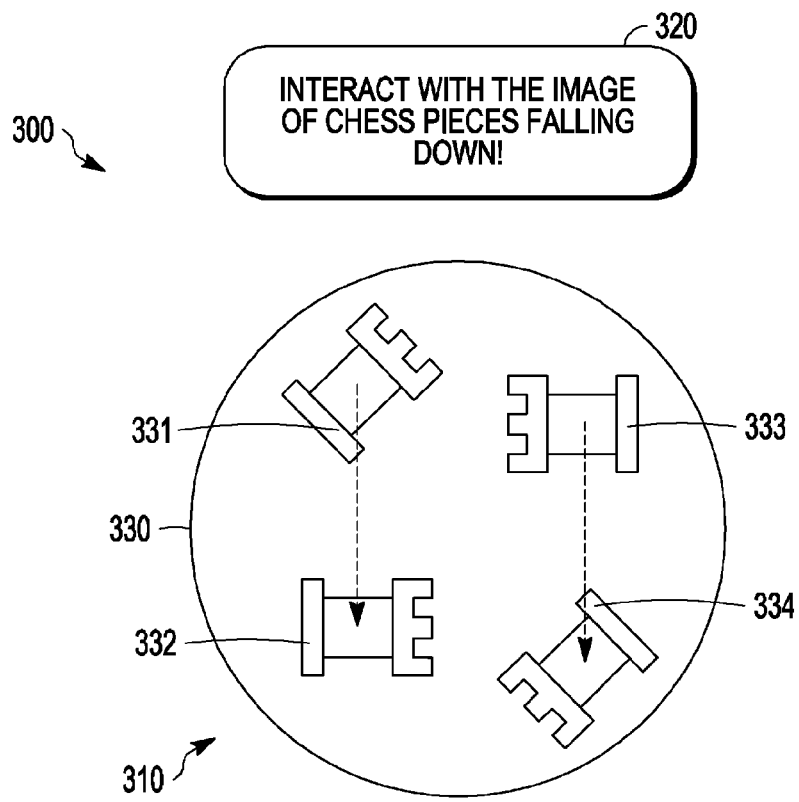
FIG. 3 illustrates a screenshot of an authentication challenge according to an embodiment of the present disclosure.
Figure 3:
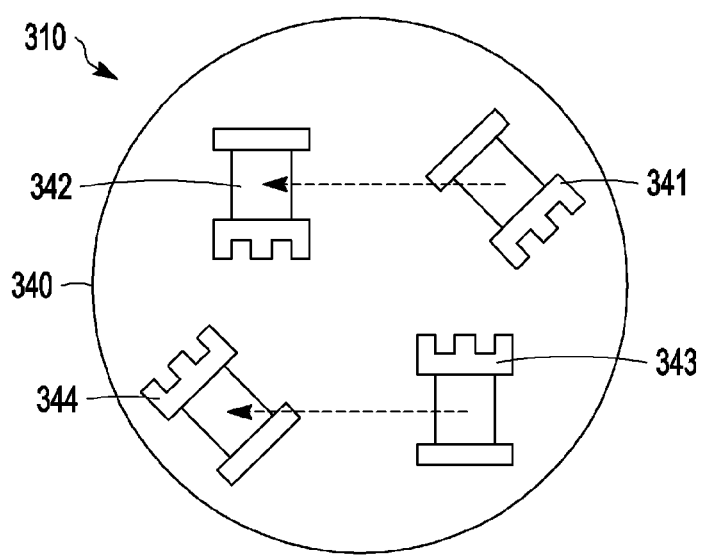

FIG. 3 illustrates a screenshot of an authentication challenge 300 presented to a user of the client device 220 according to an embodiment of the present disclosure. The authentication challenge 300 includes a number of challenge elements 310, and a challenge instruction 320 stating, "Interact with the image of the chess pieces falling down".

In this embodiment, the challenge elements 310 include a plurality of visual components in the form of challenge element 330 and challenge element 340. In the illustration, each of the challenge elements 330 and 340 includes a moving image of chess pieces moving from one position to another.

The challenge element 330 shows a chess piece moving from position 331 to position 332, along the paths indicated by the dotted lines, and another chess piece moving from position 333 to position 334, along the paths indicated by the dotted lines in the figure. Challenge element 340 shows a chess piece moving from position 341 to position 342, and another chess piece moving from position 343 to position 344.

In use a human user will perceive the chess pieces in challenge element 330 are falling downward, as if affected by gravity, and the chess pieces in challenge element 340 are not falling downward. As a result, a human should be able to conclude that the challenge element 330 correctly complies with challenge instruction 320, and the challenge element 340 does not correctly comply with challenge instruction 320. A human user should then decide that to choose challenge element 330 is a correct response.

It will be appreciated that for any one challenge instruction, many different challenge element can comply with the instruction. For example, the instruction regarding chess pieces can be associated with any one of many images, each of which is created from a different aspect of a virtual three dimensional chess piece object, using a virtual camera to view the three dimensional chess piece object in a variety of conditions to create each two dimensional challenge element. Accordingly, the challenge can be altered so that the challenge instruction remains the same, while the image contained in the challenge element is altered from one aspect of the chess piece to a different aspect of the same chess piece.

It will also be appreciated that many other possible common objects can be depicted that also could appear to be falling. For example, the image contained in the challenge element could be an item of furniture, an item of food, an animal, a hand tool, a vehicle, or a human figure, and the challenge instruction can refer to that kind of item.

Figure 4:
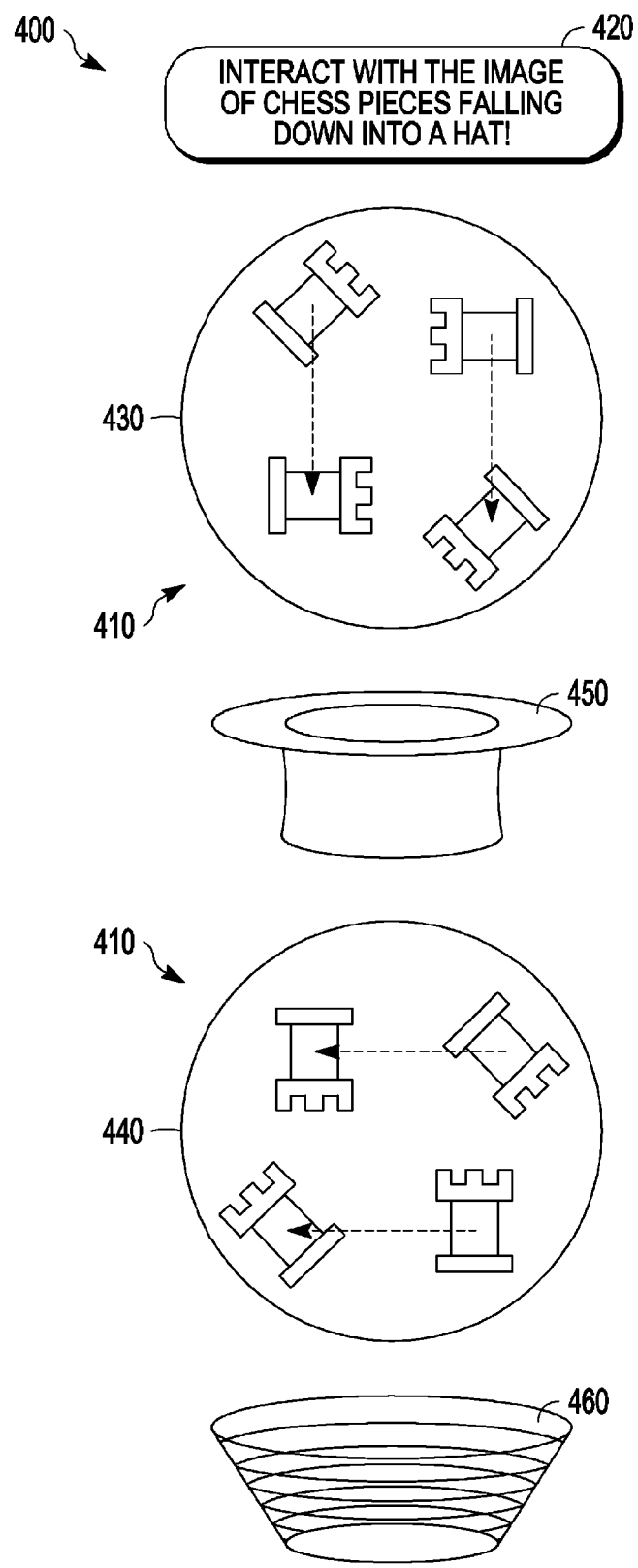
FIG. 4 illustrates a screenshot of an authentication challenge according to a second embodiment of the present disclosure.

FIG. 4 illustrates an alternative embodiment to the challenge shown in FIG. 3. In this embodiment, multiple challenge elements 410 can contain multiple challenge elements, and the challenge instruction 420 can refer to a combination of images. For example, in FIG. 4 an image of a hat 450 appears below the falling chess pieces in the challenge element 430, which can appear to be falling into the hat 450. Additionally, an image of a basket 460 appears below the moving chess pieces in challenge element 440. The challenge instruction 420 asks the user to "interact with the image of the chess pieces falling down into a hat". In this example, challenge element 430 complies with the instruction 420. If challenge element 440 portrayed the chess pieces falling down into the basket 460, challenge element 440 would still not comply with the instruction 420.

Figure 5:
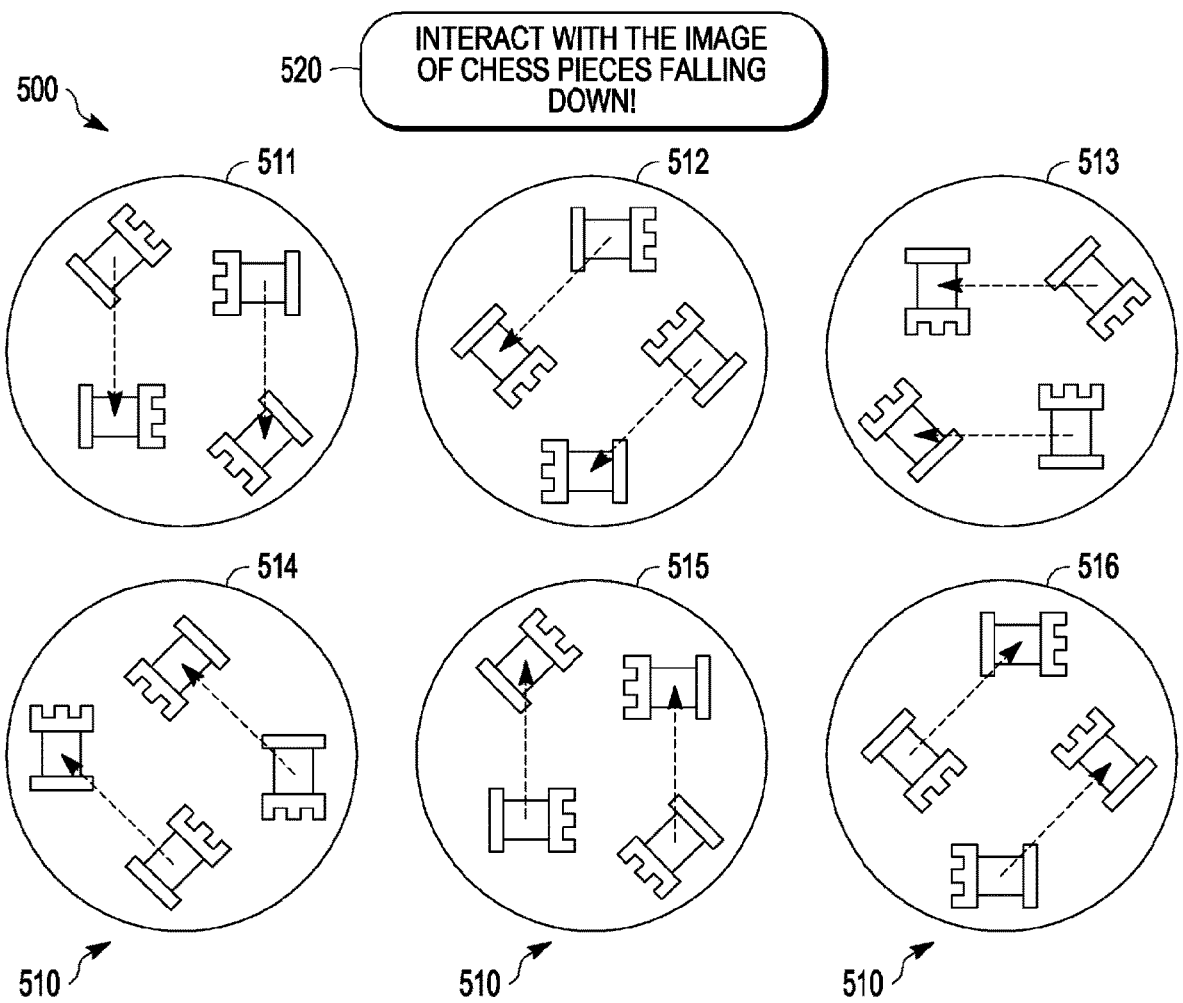
FIG. 5 illustrates a screenshot of an authentication challenge according to a third embodiment of the present disclosure.

FIG. 5 illustrates a screenshot of an authentication challenge 500 presented to a user of the client device 220 according to another embodiment of the present disclosure. The authentication challenge 500 includes a number of challenge elements 510, and a challenge instruction 520. In this embodiment, the challenge elements 510 include a plurality of visual components in the form of challenge elements 511, 512, 513, 514, 515, 516, each challenge element containing an image. The challenge elements 511, 512, 513, 514, 515, 516 are configured spatially, and in one embodiment the challenge elements 511, 512, 513, 514, 515, 516 are configured in a grid formed in part by the plurality of challenge elements 511, 512, 513, 514, 515, 516.

In this embodiment, a 3×2 grid is shown. It will be appreciated that other embodiments could use other grid configurations, for example 3×3, 2×3, 2×4, 1×6, and so on. It will also be appreciated that the challenge instruction 520 could be positioned below the grid, above the grid, to the side of the grid, or overlaying the grid. Challenge element 511 contains an image of chess pieces falling downward, and each of the challenge elements 512, 513, 514, 515, 516 includes an image of chess pieces moving in a direction other than downward.

In this embodiment, the challenge instruction 520 is to interact with the image of the chess pieces falling down. That is, the challenge instruction is to use a human-to-computer interface, such as a mouse, pointer, keyboard, human finger on a touch-sensitive screen, or human hand, finger, or eye, to interact with challenge element 511, for example to click, select, highlight, press upon, point at, or gesture at the element. In this embodiment, a correct response to the challenge instruction involves interacting with challenge element 511, and an incorrect response would be interacting with one of the other challenge elements 512, 513, 514, 515, 516. It will be appreciated that a human user would also consider a challenge element to be in compliance with a challenge instruction 520 which is phrased in a different way, for example to interact with the image that shows the pieces moving rightward, upward, in a circle, or in some other manner. Once the user has interacted with a desired challenge element 511, 512, 513, 514, 515, 516, the authentication server 210 determines whether the response is correct or incorrect.

Figure 6:
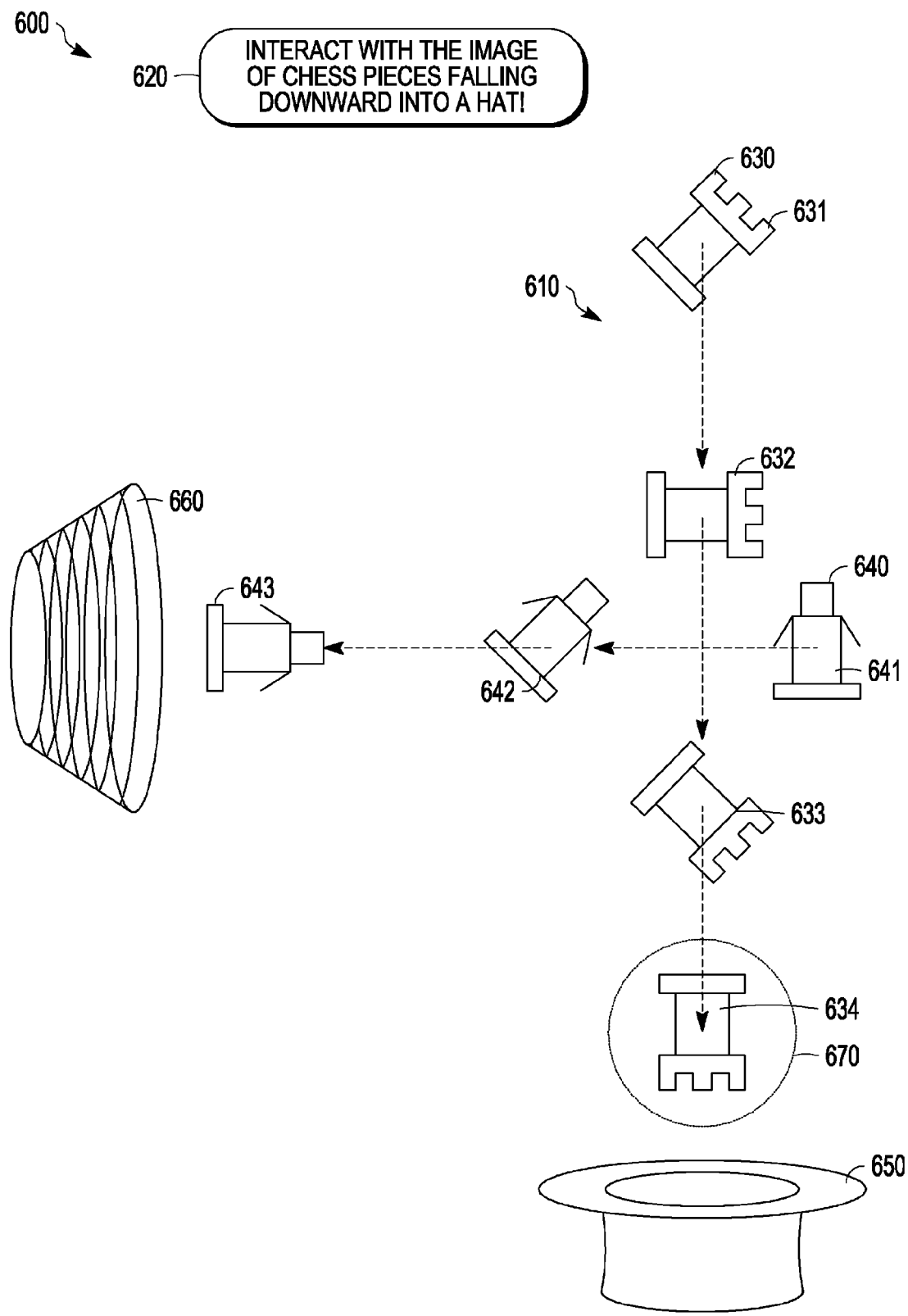
FIG. 6 illustrates a screenshot of an authentication challenge according to a fourth embodiment of the present disclosure.

FIG. 6 illustrates a screenshot of an authentication challenge 600 presented to a user of the client device 220 according to another embodiment of the present disclosure. The authentication challenge 600 includes a number of challenge elements 610, and a challenge instruction 620. In this embodiment, the challenge elements 610 include a plurality of visual components in the form of chess pieces 630 and robots 640. Each challenge element 630, 640 moves into the respective positions 631, 632, 633, 634, and 641, 642, 643, with dashed arrows indicating how each element 630, 640 moves over time.

The challenge elements 630, 640 are configured spatially within a single digitally animated framing image, and each challenge element 630, 640 is an image that has been seamlessly composed into the larger framing image so that there is no visual indication of where one element 630, 640 stops and another begins. The seamless composition of the multiple challenge elements 630, 640 is performed by the authentication server 210, and then the entire composed image is sent to the client device 220, so that it would require a large amount of labour to program an agent to distinguish one challenge element 630, 640 from another. To perform this composition, the authentication server 210 chooses an image which complies with the challenge instruction 620. In this case, a moving image that portrays chess pieces 630 falling downward into a hat 650, then composes that image onto the framing image at a random position. The authentication server 210 also chooses an image which does not comply with the challenge instruction 620, in this case a moving image that portrays robots 640 moving sideways into a basket 660, then composes that image onto the framing image at a random position. To comply with the instruction 620, a user would interact with the moving image in a way that indicates a part of the framing image, for example to use a mouse to click and select a spot on the image. The location of the spot selected and the identity of the animation frame that was visible at the time of the interaction is sent to the authentication server 210, which can calculate whether the spot selected was part of an image that complied with the instruction at the particular time. It will be appreciated that the authentication server can determine this by virtue of the authentication server having composed the image and kept a record of which images were placed in which locations of the framing image, and that this can be done by a secondary render made of the framing image in which textures of a three dimensional virtual object associated with a correct response, at the moment that the response is correct, is replaced with a texture that has a single key colour, and textures of all other three dimensional virtual objects at all other times are replaced with textures that are not this key colour, so that the key-coloured render produced shows the key colour in the pixels associated with the points in the framing image that would constitute a correct response, and this key-coloured render is used by the authentication server as a map to assess the response of the user. It will also be appreciated that the authentication server 210 can accept as a correct response a point that is closer in space to a correct object than to any other object, and performed on a frame of the animated framing image that is closer in time to the correct event than to any other event. In this embodiment, a dashed circle 670 indicates one spot on the animated framing image, the interaction with which complies with the instruction.

In an alternative embodiment, the user could be instructed to "move the hat to catch all the falling chess pieces", and the user could operate the computer interface to move the location of the hat 650, for example to touch the hat 650 with a finger and slide the finger to move the hat 650. In such an embodiment, when the challenge is presented, the hat 650 is not at the correct position, and when the user moves the hat into the correct position beneath the chess piece 630, this interaction complies with the instruction, while to move the basket 660 to the position aligned with the robots 640 would not comply with the instruction.

Figure 7:
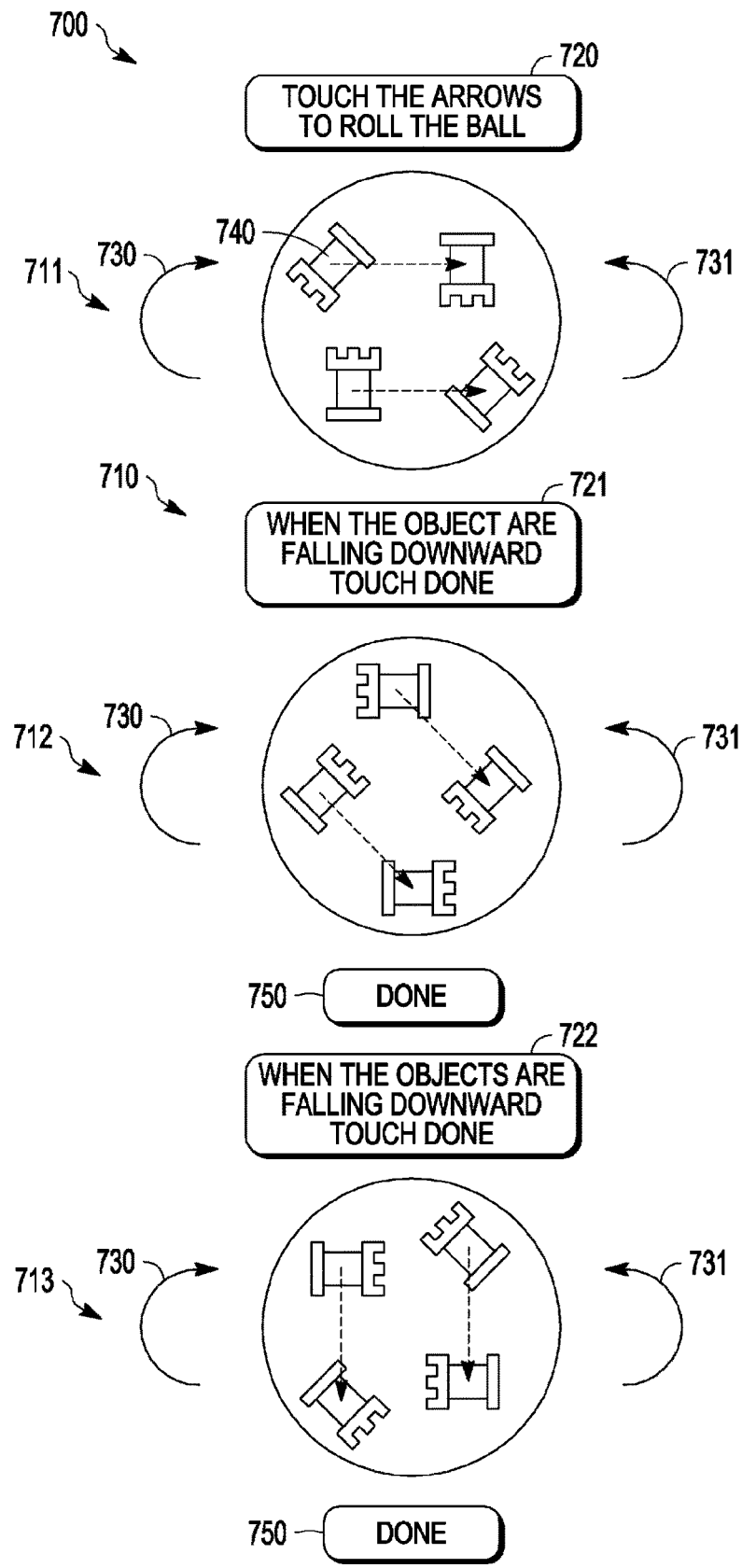
FIG. 7 illustrates a screenshot of an authentication challenge according to a fifth embodiment of the present disclosure.

FIG. 7 illustrates a screenshot 700 of an authentication challenge presented to the user of the client device 220 according to another embodiment of the present disclosure. Similar to the embodiment of FIG. 5, the authentication challenge 700 includes a challenge element display area 710, and a challenge instruction 720. The challenge element 711 appears to the user, and the instruction 720 requests the user to interact with the arrows, meaning one of the arrows 730, 731, to roll the ball. When the user interacts with arrow 730, 731, the challenge instruction 720 changes to challenge instruction 721, and challenge element 711 rotates to the position depicted in 712.

It will be appreciated that arrow 730 indicates an object moving in a clockwise rotation, and if the user interacts with arrow 730, the challenge element 712 will conform with the user's perception that challenge element 712 is what challenge element 711 would look like if challenge image 711 rotated clockwise; that is, in the direction indicated by the arrow 730 the user interacted with. In this way, by interacting with arrows 730 and 731, the user makes the challenge element rotate from the position 711, to the position 712, and can rotate to other positions as well. After interacting with arrows 730 and 731 a number of times, the challenge element rotates to the position depicted in 713.

It should be appreciated that a human user will perceive the chess pieces 740 in challenge element 713 are falling downward, as if affected by gravity. As a result a human user would conclude the challenge element 713 correctly complies with challenge instruction 720. Accordingly, a human user would decide that to choose challenge element in position 713 is a correct response. In compliance with challenge instruction 722, the user can interact with the Done button 750. When the user interacts with the "Done" button 750, the authentication server 210 determines whether the response is correct or incorrect.

Although in the embodiments shown in FIGS. 3, 4, 5, 6, 7 a single authentication challenge was presented to the user, it should be appreciated that a plurality of authentication challenges may be presented to the user in sequence.

The term "authentication" is defined broadly according to some embodiments, and may include activities that ensure that information entered into a computer, such as via a web site or computer application, is entered entirely by the normal efforts of a human user of a computing device rather than by an automated program commonly known as a tot or an 'agent', or by a human user aided by such an automated program.

The term "image" is defined broadly according to some embodiments, and may include a graphic element with clear boundaries and borders that set it apart from its surroundings, or a graphic element within a larger graphic element, the smaller element having an identity implied as separate from other images near to it, this separation being obvious to a typical human user.

The term "graphic element" is defined broadly according to some embodiments, and may include a two-dimensional map of pixels, or a three-dimensional mesh of polygons, a stream of successive two-dimensional maps of pixels to result in a moving image, or a stream of successive instructions to change a three-dimensional mesh of polygons to result in a moving image. In the case of a three-dimensional mesh of polygons, the authentication server 210 may construct this mesh from multiple elements and algorithms stored on the server, and apply random changes to the mesh, resulting in a mesh that is sent to the client device 220, and the client device displays that mesh to the user by use of a program that produces a virtual visual output in a two-dimensional or three-dimensional form.

In some embodiments, if the user of the client device 220 provides an incorrect response to the authentication challenge, a further authentication challenge may be presented to the user to complete.

In some embodiments, the authentication server 210 receives information about the client device 220. For example, the authentication server may receive the Internet Protocol address used by the client device 220, the kind of software programs and other digital assets instantiated on the client device 220, or the internet service provider which client device 220 uses to connect to the internet.

In some embodiments, the authentication server 210 may send to the client device 220 one of a set of possible alternative embodiments of the disclosure, the embodiment determined by a process which compares the information about the device client 220 to information previously received from device clients, determines from this comparison that device client 220 is likely the same device from which the authentication server 210 received information previously, considers the actions performed by the device client 220, and as a result selects one of a set of possible alternative embodiments of the disclosure. For example, the client device 220 sends to the authentication server 210 an Internet Protocol address, the authentication server compares this address to addresses previously received, finds that the address matches one previously received, inspects the actions performed by the client device 220 after sending the previously received address, discovers that the actions performed by client device 220 include incorrect responses to challenges sent by authentication server 220, and as a result, the authentication server 210 sends to client device 220 an embodiment of the disclosure that contains multiple additional challenges.

In some embodiments, an application server 230 receives information about the client device 220, and communicates this to the authentication server 210. For example, the application server may record the actions performed by client device 220 as it interacts with application server 230.

In some embodiments, the authentication server 210 may send to the client device 220 one of a set of possible alternative embodiments of the disclosure, the embodiment determined by a process which receives the information about the device client 220 from application server 230, considers the actions performed by the device client 220, and as a result selects one of a set of possible alternative embodiments of the disclosure. For example, the client device 220 performs actions on application server 230 which produce many chat messages in one second, the application server 230 sends information to authentication server 210 about the number and timing of chat messages produced by client device 220, and as a result, the authentication server 210 sends to client device 220 an embodiment of the disclosure that contains challenges which can only be solved by an agent that requires a very high amount of labour to program.

Figure 8:
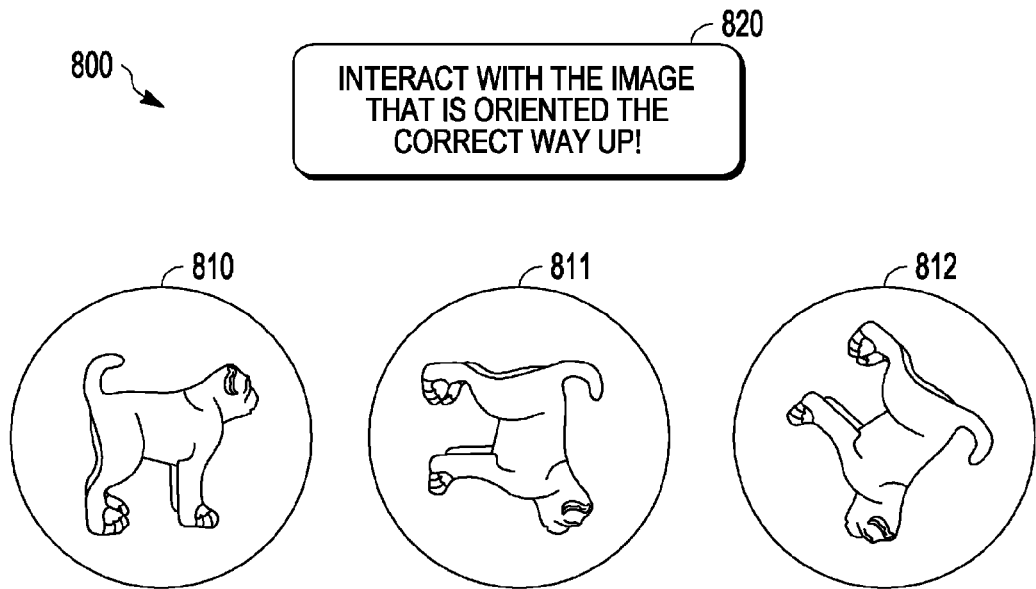
FIG. 8 illustrates a screenshot of an authentication challenge according to a sixth embodiment of the present disclosure.

FIG. 8 illustrates a screenshot of an authentication challenge 800 presented to a user of the client device 220 according to another embodiment of the present disclosure. In this embodiment, the challenge instruction 820 is to interact with the image that is oriented the correct way up.

It will be appreciated that only challenge element 810 complies with the challenge instruction, in that a human would conclude that the correct position for a four-legged animal like the one portrayed is for the animal to look like it is standing on its legs, with the legs pointing downward. In this embodiment, a correct response to the challenge instruction would be to interact with challenge element 810, and an incorrect response would be to interact with one of the other challenge elements 811, 812. Once the user has interacted with a desired challenge element 810, 811, 812, the authentication server 210 determines whether the response is correct or incorrect.

Figure 9:
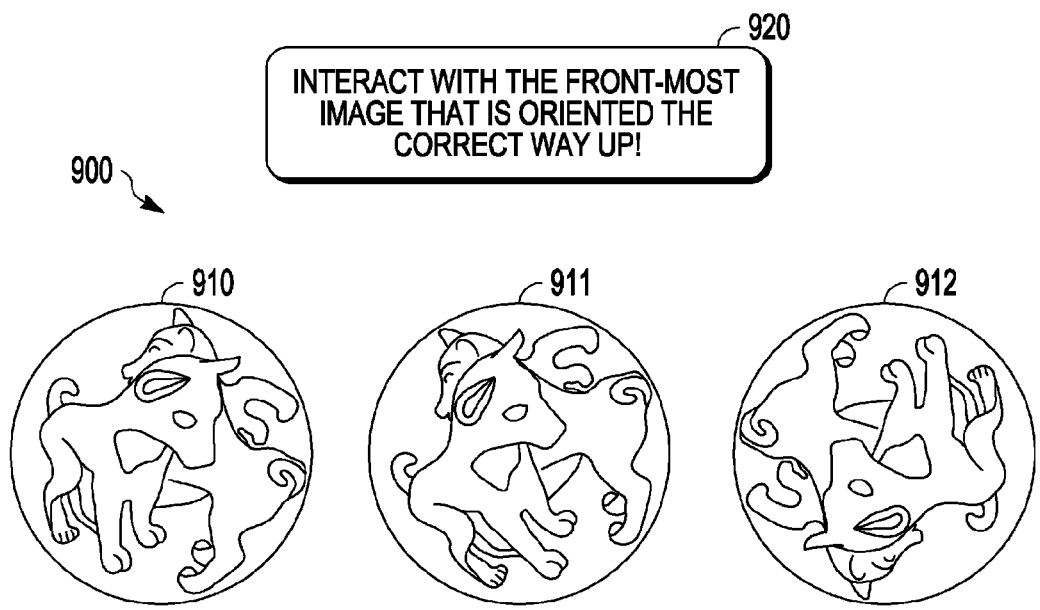
FIG. 9 illustrates a screenshot of an authentication challenge according to a seventh embodiment of the present disclosure.

In another embodiment illustrated in FIG. 9, the challenge instruction 920 is to interact with the front-most image that is oriented the correct way up. Each of the challenge elements 910, 911, 912 is composed of multiple images, each image positioned so that it overlaps or is overlapped by another image, to form what appears to be a stack of overlaid images, with one image appearing to be at the front of the stack, that is, overlapping other images but being overlapped by no other image.

It will be appreciated that only challenge element 910 complies with the challenge instruction, in that a human would distinguish, in each challenge element 910, 911, 912, the image at the front of the stack of images, that is the "front-most image", and conclude that the correct position for a four-legged animal like the one portrayed in the front-most image in challenge element 910 is for the animal to look like it is standing on its legs, with the legs pointing downward.

In this embodiment, a correct response to the challenge instruction would be to interact with challenge element 910, and an incorrect response would be to interact with one of the other challenge elements 911, 912.

Once the user has interacted with a desired challenge element 910, 911, 912, the authentication server 210 determines whether the response is correct or incorrect. In additional examples, an element in which the front-most image is upright also contains one or more images that appear not to be in an upright position, for example an animal with its legs pointing upward. In additional examples, an element in which the front-most image is not upright also contains one or more images that appear to be in an upright position, for example an animal with its legs pointing downward. In additional examples, the front-most image on a stack of images is partially surrounded by a dark area matching part of the outline of the image, to simulate a shadow cast by the object in the front-most image upon the images in the stack besides the front-most, in a manner that increases the human visual perception that the front-most image is clearly in front of all the others.

Figure 10:
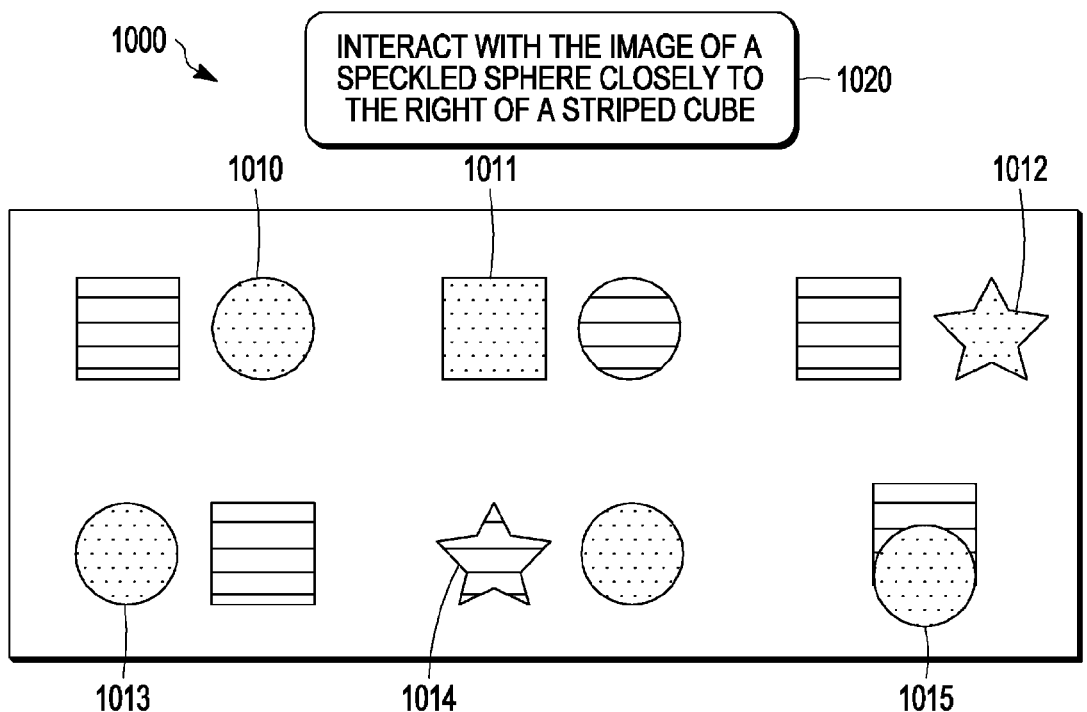
FIG. 10 illustrates a screenshot of an authentication challenge according to an eighth embodiment of the present disclosure.

FIG. 10 illustrates a screenshot of an authentication challenge 1000 presented to a user of the client device 220 according to another embodiment of the present disclosure. In this embodiment, the challenge instruction 1020 is to interact with the image of a speckled sphere closely to the right of a striped cube. It will be appreciated that only challenge element 1010 complies with the challenge instruction, in that it is the only element that contains the image of a sphere that is speckled, and the sphere is directly to the right side of an image of a cube that is striped.

In this embodiment, a correct response to the challenge instruction involves interacting with challenge element 1010, and an incorrect response would be interacting with one of the other challenge elements such as elements 1011, 1012, 1013, 1014, 1015. Once the user has interacted with a desired challenge element such as elements 1010-1015, the authentication server 210 determines whether the response is correct or incorrect. The authentication server 210 composes the challenge elements 1010-1015 by using a composition program in such a manner that it would require a large amount of labour to program an agent to distinguish a correct response from an incorrect response.

The composition program would first determine the challenge instruction by choosing randomly from a set of possible shape words, for example choosing one of the shapes "sphere", "cone", "cube", "pyramid", "tube", "ring", or "star", then precede the shape word with a random selection from a set of possible material words, for example choosing one of the materials "shiny", "speckled", "wooden", "glassy", "furry", "striped", or "stone", then precede the material word with a random selection from a set of possible comparison words, for example "largest", "smallest", "tallest", "shortest", "flattest", or "widest". The instruction is then appended with a random selection from a set of possible position words, such as "closely to the right of", "closely to the left of", "behind", "in front of", "over", "under", "touching", or "on", and then further appended with another set of randomly selected words, none of which have been selected so far, appending a material word, a comparison word, and a shape word.

The composition program would then create one or more elements that comply with the challenge instruction by selecting from an inventory of virtual three-dimensional objects one that matches the first part of the instruction, for example a large speckled sphere, inserting a render of that object as an image into the challenge element, then selecting from an inventory of virtual three-dimensional objects one that matches the second part of the instruction, for example a wide striped cube, and inserting a render of that object as an image into the challenge element in a position that corresponds with the position word in the instruction, for example so that the large speckled sphere image is closely to the right of the wide striped cube image.

The composition program would then create one or more elements each of which do not comply with the challenge instruction by following the same procedure that produced the element that complies with the challenge instruction, but changing one of more of its aspects with regards to an object's shape, material, comparison, or position, continuing the previous example so that a large shiny speckled image is to the left of a wide striped cube image, or a large furry sphere is to the right of a wide striped cube image, or a large speckled sphere image is to the right of a thin striped cube image. It will be appreciated that an agent programmed to recognise one aspect, but not other aspects, will fail to choose the correct challenge element. For example, an agent programmed to recognise a sphere may not distinguish a speckled sphere from a furry sphere.

In another embodiment, the challenge instruction can include a directive for the user to move a challenge element to a position relative to another challenge element, for example "to the right of", "to the left of", "above", "below", "to touch", or "on", and to make a correct response the user must operate the computer interface in a way that moves a challenge element to a position that is named in the instruction as compared to a challenge element described in another part of the instruction, and to make an incorrect response the user must operate the interface in a way that moves a challenge element to a position that is not named in the instruction as compared to a challenge element described in another part of the instruction.

Figure 11:
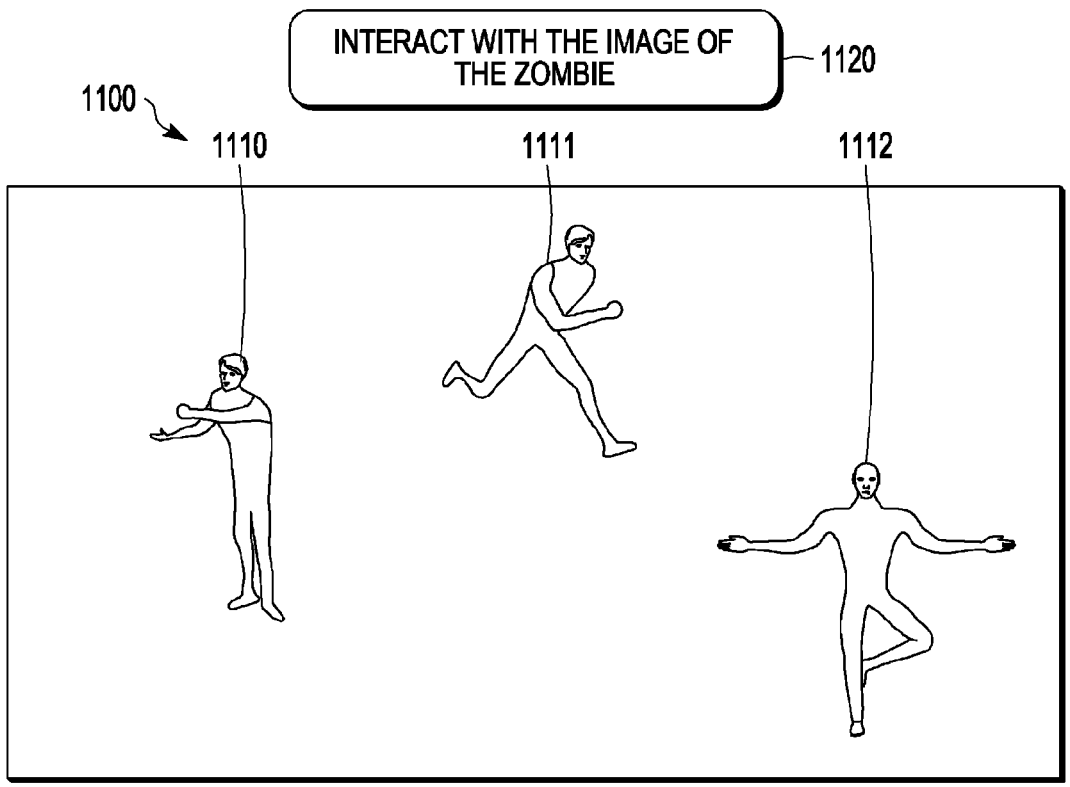
FIG. 11 illustrates a screenshot of an authentication challenge according to a ninth embodiment of the present disclosure.

FIG. 11 illustrates a screenshot of an authentication challenge presented to a user of the client device 220 according to another embodiment of the present disclosure. In this embodiment, the challenge instruction 1120 is to interact with the image of a zombie, and a framing image 1100 contains challenge elements 1110, 1111, 1112 which each are a moving image of a human figure.

It will be appreciated that only challenge element 1110 complies with the challenge instruction, in that it is a moving image that shows a human figure moving in a clumsy, unnatural manner consistent with popular depictions of a zombie. It will be appreciated the moving image in challenge element 1110 could be produced by using a virtual camera to render a three-dimensional polygonal mesh which is distorted by an animation sequence, and that the unnatural manner of the zombie can be produced by merely changing the animation sequence of the mesh of the moving image to have an uneven speed and cadence, so that no single frame of the animation is unique to the zombie, and that to find the zombie, it requires a large amount of human labor to construct an agent to examine not just individual frames of animation, but the way in which each frame relates to the frame before and after it in the sequence. Thus, in this embodiment, a correct response to the challenge instruction involves interacting with the framing image 1100 at a point occupied by challenge element 1110, and an incorrect response would be interacting with the framing image 1100 at a point occupied by one of the other challenge elements 1111, 1112.

Once the user has interacted with the framing image in a way that indicates a desired challenge element 1110, 1111, 1112, the authentication server 210 determines whether the response is correct or incorrect. A person skilled in the art will appreciate that it would be highly labour intensive to program or train an agent to recognise a challenge element that complies with the instruction, because it is insufficient to examine any one moment of the moving image in the challenge elements 1110, 1111, 1112. It is only sufficient to examine how one moment relates to the next moment to determine that the manner of movement is clumsy and unnatural, and this task requires even more labour if the difference between an element 1110, 1111, 1112 that complies with the instruction 1120 and one that does not comply is the order and timing of the moment or frames within the animation, so that any one moment or frame cannot possibly determine whether an element is or is not in compliance with the instruction.

In other embodiments, the challenge instruction can designate another property that requires evaluation of the way the image moves. For example the instruction could be to interact with the element that is "a bad dancer", "an uncomfortable person", or "an intoxicated person".

It will be appreciated that an agent which is programmed to designate one kind of image, for example images of intoxicated persons, will remain unable to designate other kind of image, for example images of bad dancers.

Figure 12:
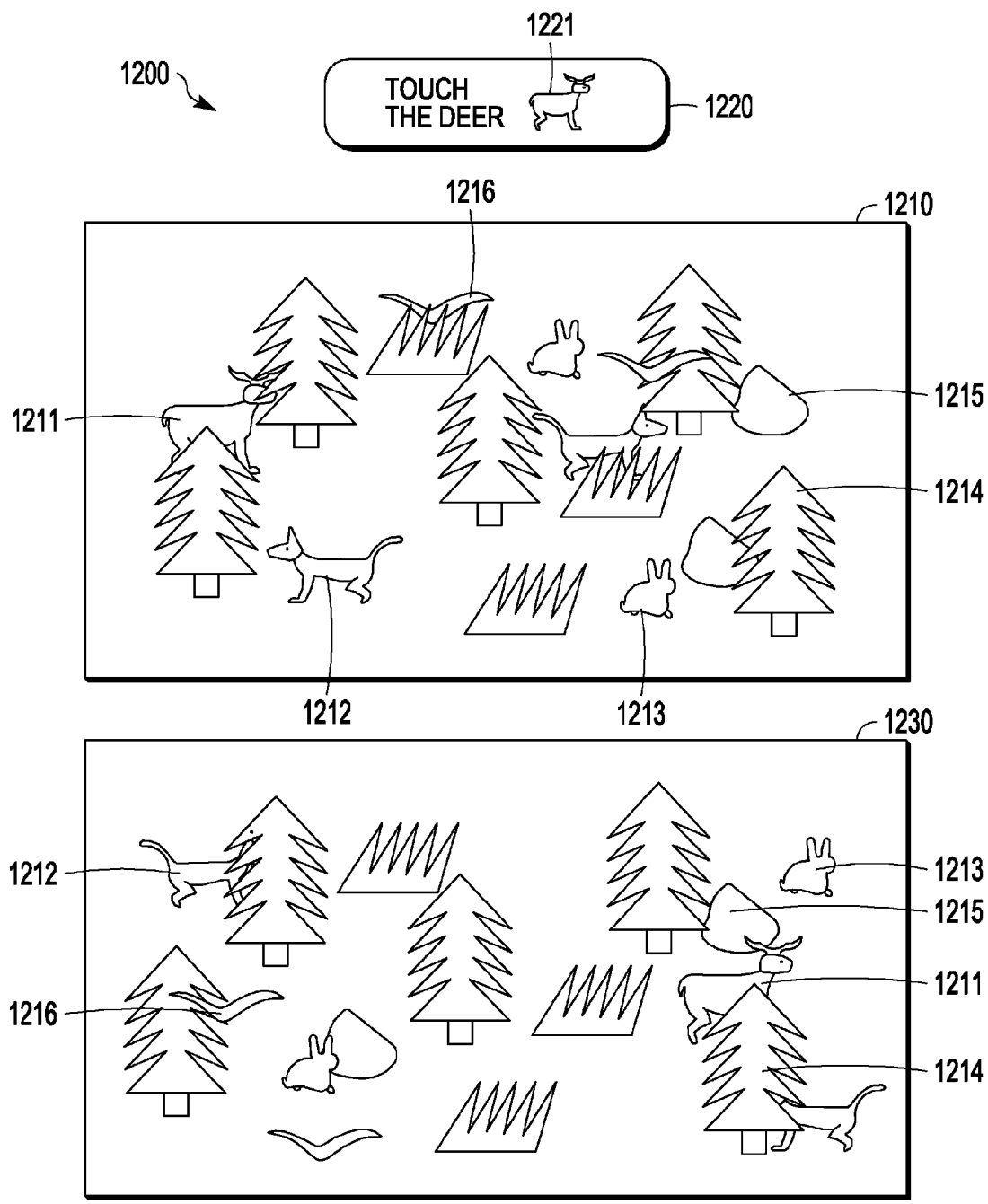
FIG. 12 illustrates a screenshot of an authentication challenge according to a tenth embodiment of the present disclosure.

FIG. 12 illustrates a screenshot of an authentication challenge 1200 presented to a user of the client device 220 according to another embodiment of the present disclosure. In this embodiment, the challenge instruction 1220 is to keep interacting with the image of the deer, and next to the text of the instruction 1220 is a depiction of the deer 1221. Similar to previous embodiments, the authentication challenge includes a number of challenge elements 1211, 1212, 1213, 1214, 1215, 1216 which are configured spatially within a single framing image 1210, and each challenge element is an image that has been seamlessly composed into the larger framing image 1210 so that there is no visual indication of where one element stops and another begins. In this embodiment, the challenge elements depict objects in a forest.

One of the challenge elements 1211 depicts a deer walking. As the challenge element 1211 moves across the screen, it sometimes occludes and is sometimes occluded by challenge elements 1212-1216. Some of the challenge elements 1212-1216 can move across the screen, to sometimes occlude and sometimes be occluded by other challenge elements.

In this example, the challenge element of the dog 1212 can move across the screen. Over time, the challenge elements move into new positions to form a set of challenge elements 1230, in which the deer 1211, the dogs 1212 and the birds 1216 have moved to new positions. When the challenge instruction 1220 appears, the user selects a point within the framing image 1210, for example by interacting with an point on the framing image occupied by the challenge element 1211, portraying the deer. To be deemed a correct response, the selected point, at the time it was selected, was a distance to a correct challenge element smaller than a distance from that point to any other challenge element.

It will be appreciated that challenge instruction 1220 could be phrased in a different way to indicate alternate instructions, for example to interact with the deer once, to keep interacting with the deer repeatedly, to tickle the deer, to drop food for the deer to eat, or to fire a gun at the deer.

Figure 13:
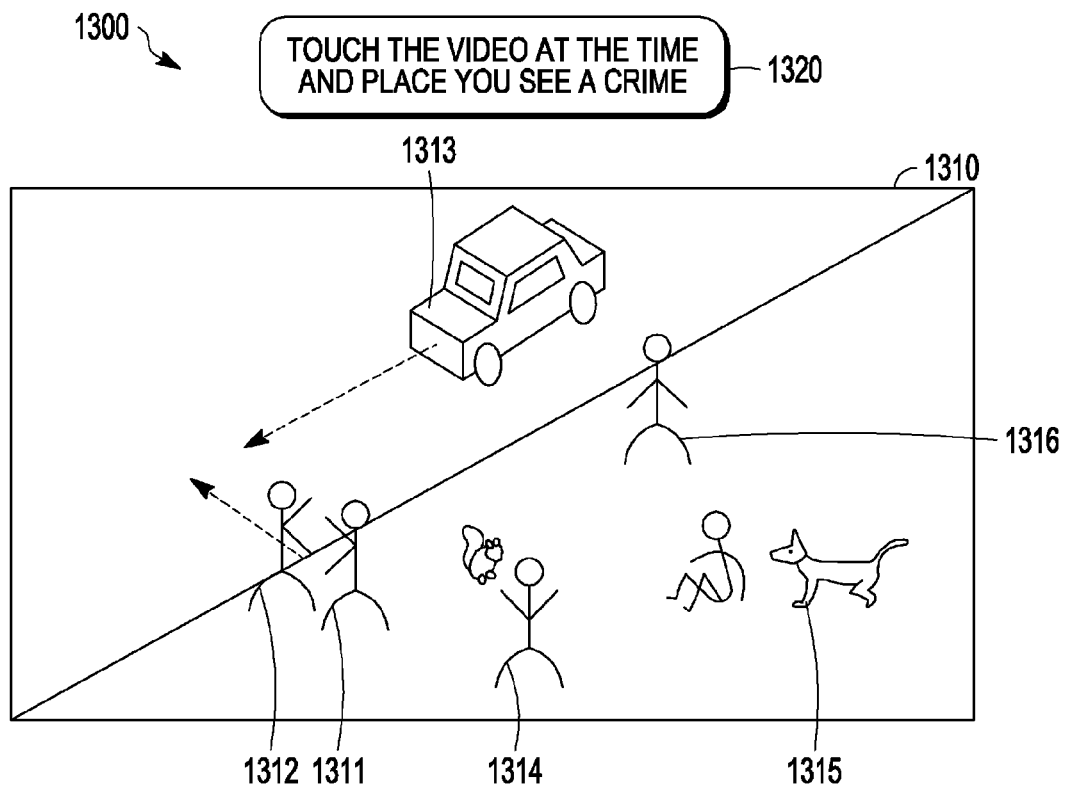
FIG. 13 illustrates a screenshot of an authentication challenge according to an eleventh embodiment of the present disclosure.

FIG. 13 illustrates a screenshot of an authentication challenge 1300 presented to a user of the client device 220 according to another embodiment of the present disclosure. In this embodiment, the challenge instruction 1320 is to interact with the video 1310 at the time and place the user sees a crime being committed.

Similar to previous embodiments, the authentication challenge includes a number of challenge elements 1311, 1312, 1313, 1314, 1315, 1316 which a composition program on the authentication server 210 configures spatially within a single framing image, and each challenge element is an image that the composition program seamlessly composes into the video 1310 so that there is no visual indication of where one element stops and another begins. In this embodiment, each of the challenge elements 1311, 1312, 1313, 1314, 1315, 1316 are produced by the composition program using a virtual camera to render a virtual three-dimensional object, and the object animates by use of a randomly selected one of a plurality of animations manipulating the three-dimensional mesh of the object. The composition program composes video 1310 by first determining a challenge instruction 1320, such as to identify a crime, then to choose an animation to comply with the challenge instruction 1320 by choosing randomly from a plurality of possible animations, for example shoving, stealing, hitting, tripping, or intimidating, then choose from a plurality of virtual three-dimensional objects that depict possible perpetrators, for example a big man, a small man, a big woman, a small woman, or a child, then choose from a plurality of virtual three-dimensional objects that depict possible victims, for example a big man, a small man, a big woman, a small woman, a child, a dog, or a squirrel. The composition program creates the video 1310 to comply with the challenge instruction 1320 by applying the animation to the objects portraying the perpetrator and the victim, then inserts those objects into a virtual three-dimensional scene, and then applies animation to the two objects to move them to other positions at frames forward and backward in the scene over time. The composition program then creates other elements each of which do not comply with the challenge instruction by inserting other objects performing other animations which move them to positions that do not occlude the perpetrator and victim objects at the moment of the crime. It will be appreciated it requires a large amount of human labor to construct an agent that can simultaneously recognise all of the necessary aspects that depict the correct response. For example, an agent programmed to recognise a man may not distinguish a walking man from a man shoving someone. As another example, an agent programmed to recognise one kind of crime such as stealing may not identify another kind of crime such as shoving.

In this embodiment, the challenge elements depict objects and people on a city street. One of the challenge elements 1311 depicts a person making a shoving motion, and another challenge element 1312 depicts a person stumbling backwards into the street, into the path of an oncoming car 1313. As the images in challenge elements 1311, 1312, 1313, 1314, 1315, 1316 move across the screen area of the video 1310, they sometimes occlude one another, cross over each other and overlap, and move into and out of shadowy areas that partially obscure the challenge elements.

In this illustrated example, when the animation in challenge element 1311 shows the person shoving the other person 1312, the user selects a point within the animated video 1310, for example by interacting with or clicking an area of the screen on the challenge element 1311 at the time that the image in challenge element 1311 performs the shoving motion. To be deemed a correct response, the selected point, at the time it was selected, was a distance to a correct challenge element smaller than a distance from that point to any other challenge element. An incorrect response would be to tap the point occupied by challenge element 1311 several seconds before or after the shoving motion was made. Another incorrect response would be to tap a point occupied by any other challenge element at any other time.

It will be appreciated by a person skilled in the art that a human user would also consider challenge element 1311 in compliance with a challenge instruction 1320 which is phrased in a different way, for example to interact with the video 1310 to take a picture of a crime, to catch the bad man, to catch a criminal, to point out someone breaking the law, or to ask the police to look at something wrong.

It will also be appreciated that the animated video 1310 contains many kinds of people, objects, and animals performing many kinds of activities which could be used to produce a large variety of challenges each of which could comply with a different challenge instruction 1320. For example, the challenge instruction 1320 could be to interact with the video 1310 at the time and place the user sees a dog approach a sitting man, or sees a person surprised by a squirrel. As another example, if the challenge instruction 1320 were not visible during the first part of the animated visual sequence, and before the instruction appeared the person 1314 was surprised by the squirrel, the instruction "tap the person who was surprised by a squirrel" could appear later in the sequence, and the correct response would be to tap the image at the point currently occupied by the person 1314, regardless of the fact that the person was no longer near the squirrel.

Figure 14:
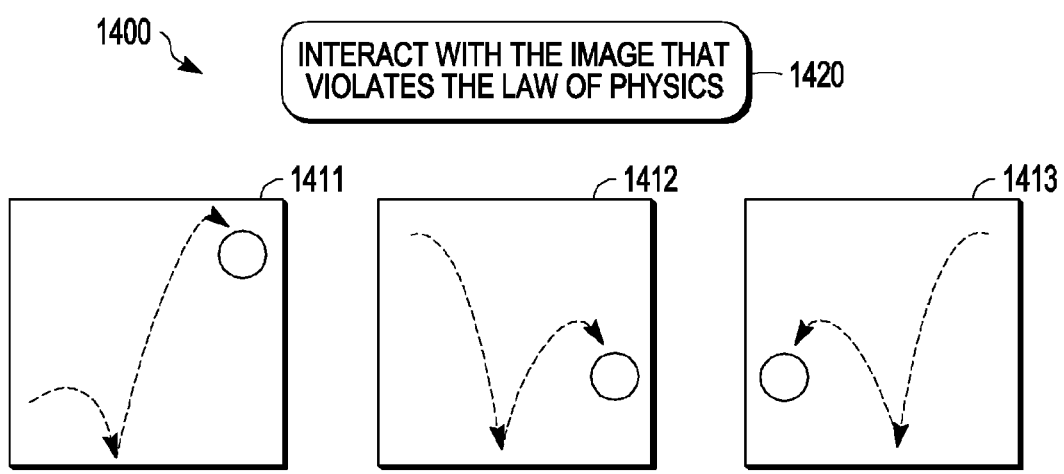
FIG. 14 illustrates a screenshot of an authentication challenge according to a twelfth embodiment of the present disclosure.

FIG. 14 illustrates a screenshot of an authentication challenge 1400 presented to a user of the client device 220 according to another embodiment of the present disclosure. In this embodiment, the challenge instruction 1420 is to interact with an image that violates the laws of physics. Each of the challenge elements 1411, 1412, 1413 contains an animated image showing the path of a ball falling from a height, striking a table, and bouncing off the table, along the paths indicated by the dotted lines in each of the elements 1411, 1412, 1413.

Only challenge element 1411 complies with the challenge instruction 1420, in that it is the only element that contains the image of a ball that bounces along a path that appears to violate the laws of physics. In the element 1411, the ball bounces higher than the height from which it fell, which appears to be a violation of the laws of physics such as the law of conservation of energy.

Accordingly, in this embodiment, a correct response to the challenge instruction involves interacting with challenge element 1411, and an incorrect response would be interacting with one of the other challenge elements 1412, 1413. Once the user has interacted with a desired challenge element 1411, 1412, 1413, the authentication server 210 determines whether the response is correct or incorrect.

A human user could also consider challenge element 1411 in compliance with a challenge instruction which is phrased in a different way, for example to interact with the image that looks wrong, false, fake, or strange.

Figure 15:
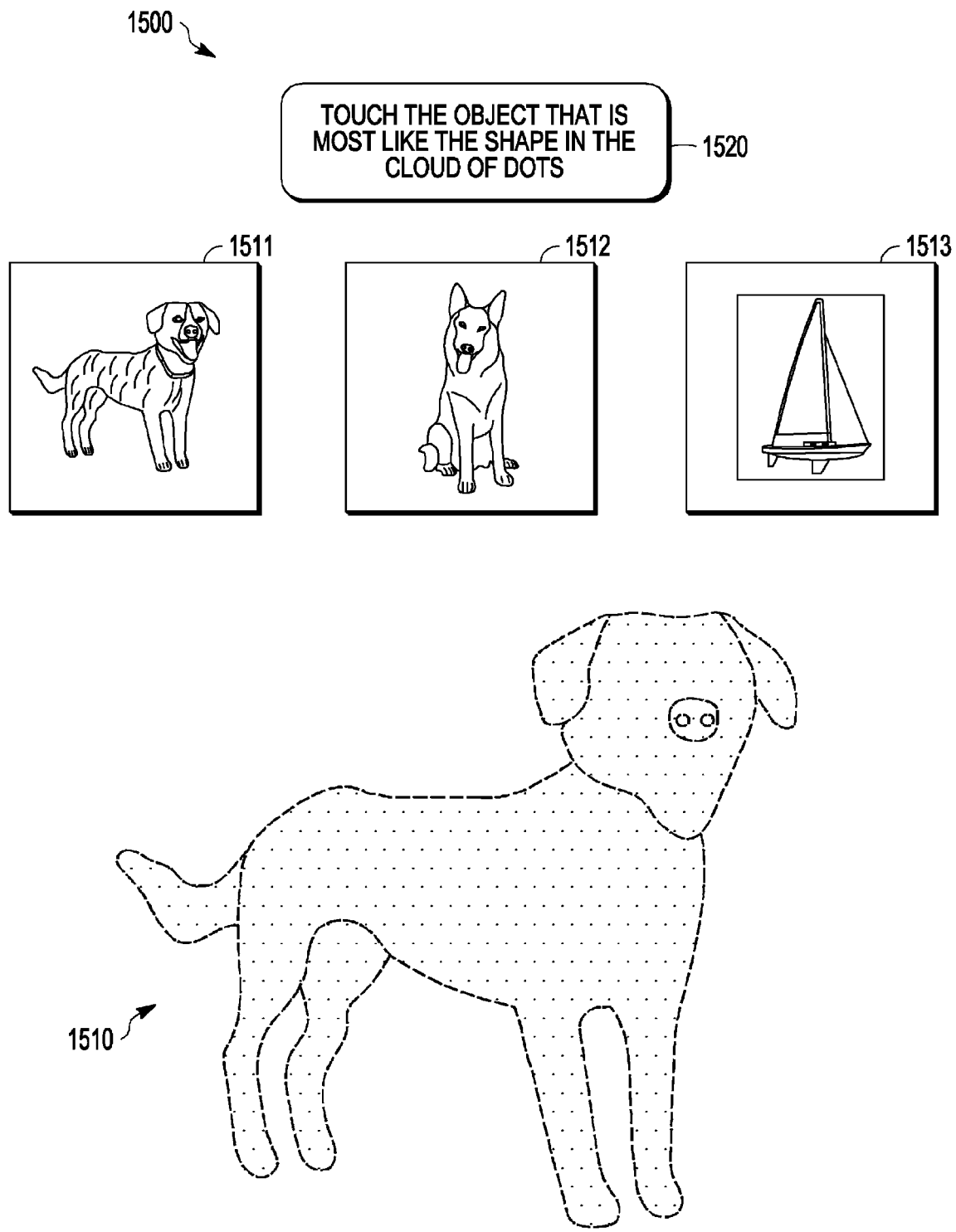
FIG. 15 illustrates a screenshot of an authentication challenge according to a thirteenth embodiment of the present disclosure.

FIG. 15 illustrates a screenshot of an authentication challenge 1500 presented to a user of the client device 220 according to another embodiment of the present disclosure. In this embodiment, the challenge instruction 1520 is to interact with the object that is most like the shape seen in a cloud of dots. The illustrated authentication challenge includes a reference element 1510, containing a moving image with moving dots, in which the dots move within the invisible outline of a particular shape, and move most often along invisible lines that conform to particular linear features. The authentication challenge includes a set of possible challenge elements defined by separate challenge elements 1511, 1512, 1513. As can be seen, each element contains an image of an object.

In use, a human user should perceive that the image in the reference element 1510 most closely conforms with the shape and features of the image in the challenge element 1511, a dog standing with its mouth to the right and its tail to the left. Therefore, a correct response to the challenge instruction 1520 involves interacting with challenge element 1511, and an incorrect response would be interacting with one of the other challenge elements 1512, 1513.

Once the user has interacted with a desired challenge element 1511, 1512, 1513, the authentication server 210 determines whether the response is correct or incorrect. It will be appreciated that a human user would also consider challenge element 1511 in compliance with a challenge instruction which is phrased in a different way. For example a challenge instruction could be to interact with the image that matches what you see in the cloud, that looks like the swarm of bees, or that shows the same object that you see in the moving picture.

In an alternative embodiment, the reference element 1510 can contain a realistic static image, for example a photograph of a spiral galaxy, and the challenge elements 1511, 1512, 1513 can each contain a moving cloud of dots. Challenge element 1511 could contain a moving cloud of dots in the general shape of a spiral galaxy, and challenge elements 1512, 1513 each contain a moving cloud of dots that are not in the general shape of a spiral galaxy. The challenge instruction 1520 can be to interact with the cloud of dots that is most like the shape seen in the reference image, for example to interact with the object that is most like the photograph of the spiral galaxy.

Figure 16:
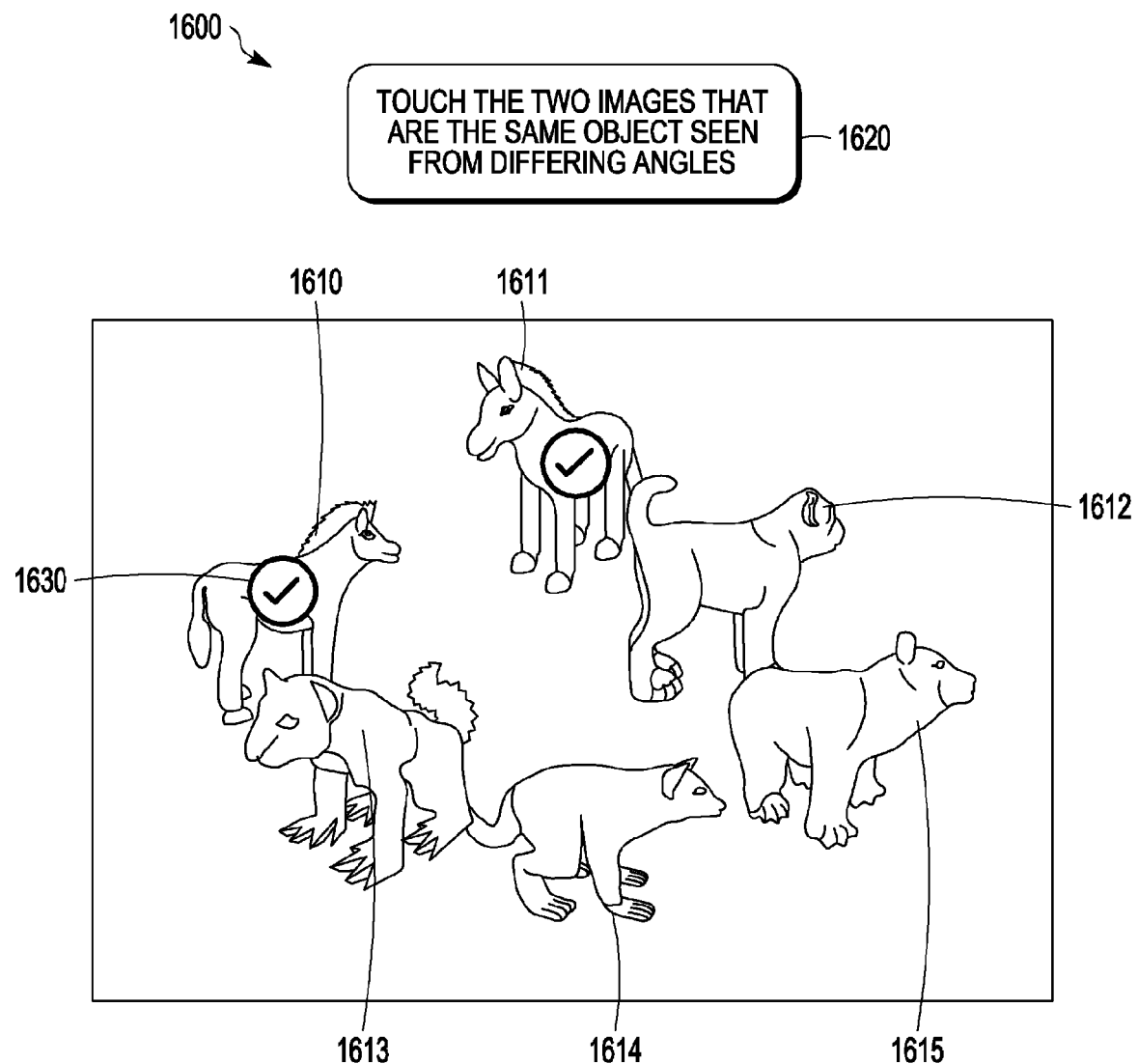
FIG. 16 illustrates a screenshot of an authentication challenge according to a fourteenth embodiment of the present disclosure.

FIG. 16 illustrates a screenshot of an authentication challenge 1600 presented to a user of the client device 220 according to another embodiment of the present disclosure. In this embodiment, the challenge instruction 1620 is to interact with the two images that are the same object seen from differing angles. In use, when the user interacts with an element, for example by using a mouse to click a point occupied by challenge element 1610, a mark 1630 appears on the element, and when the user interacts with another element, for example by using a mouse to click a point occupied by challenge element 1611, a mark 1631 also appears on the element.

It will be appreciated that only the pair of challenge elements 1610 and 1611 comply with the challenge instruction 1620, in that they are the only elements that contain images in which the depicted object, in this example a horse with an erect mane, is the same object in both images 1610, 1611, as viewed from two different angles.

Therefore, a correct response to the challenge instruction 1620 involves interacting with each of the challenge elements 1610 and 1611, and an incorrect response would be interacting with at least one of the other challenge elements 1612, 1613, 1614, 1615.

Once the user has interacted with two desired challenge elements 1610-1615, the authentication server 210 determines whether the response is correct or incorrect.

Figure 17:
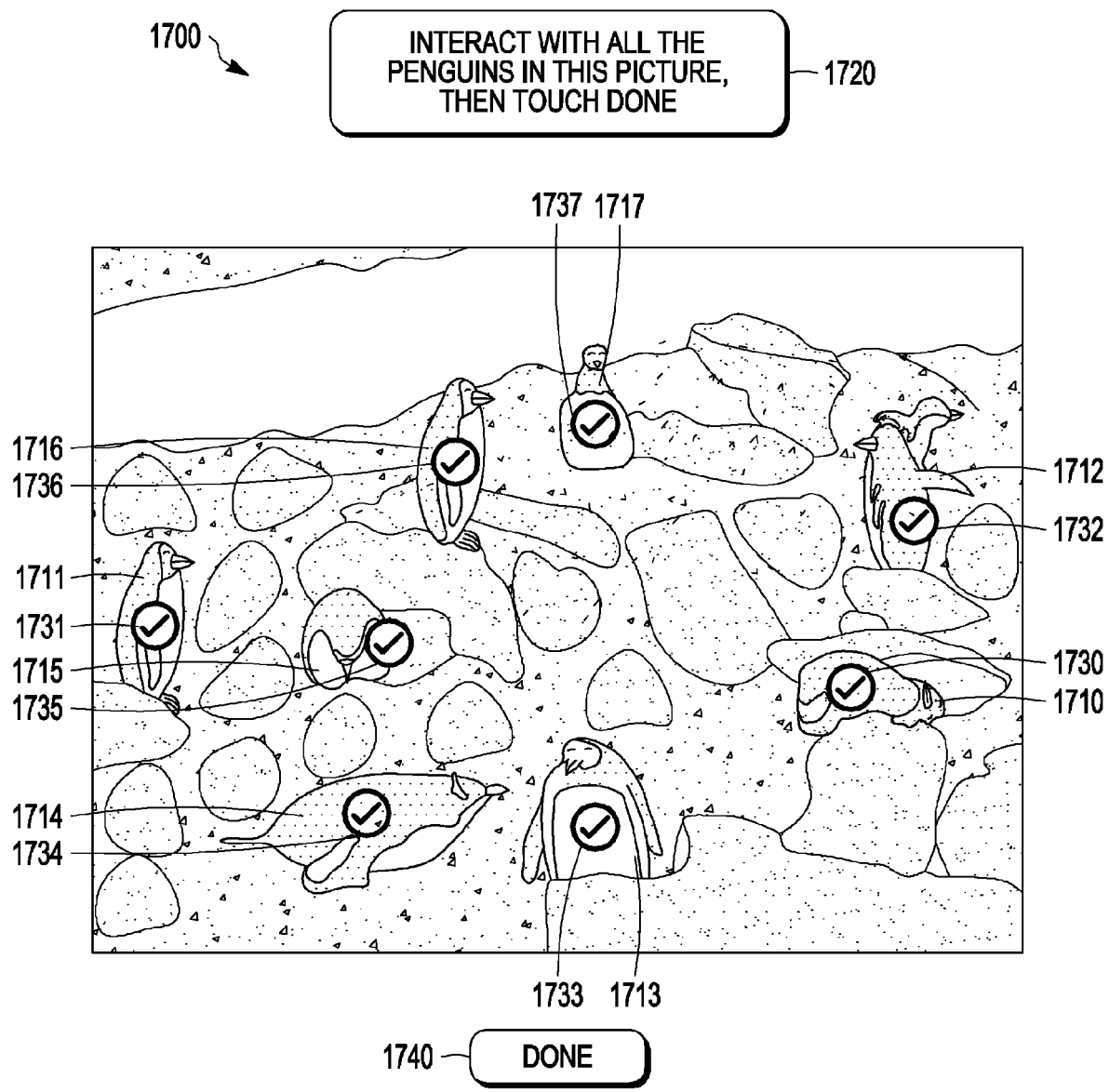
FIG. 17 illustrates a screenshot of an authentication challenge according to a fifteenth embodiment of the present disclosure.

FIG. 17 illustrates a screenshot of an authentication challenge 1700 presented to a user of the client device 220 according to another embodiment of the present disclosure. In this embodiment, the challenge instruction 1720 is to interact with all the images of penguins contained in a framing image. This authentication challenge uses simulated images of a natural phenomenon. The images are those which scientists cannot generally classify by automated means, but which a human can classify with the human's innate skills. This authentication challenge relies on similar principles to those utilised in civilian-powered research projects, such as the Zooniverse project.

In use, when the user interacts with the framing image at a point occupied by a challenge element, for example a penguin 1710, a mark 1730 appears on the penguin 1710 in the form of a tick, and when the user interacts with another challenge element, for example the penguin 1711, a mark 1731 also appears on the penguin 1711.

It will be appreciated that only the penguins 1710-1717 comply with the challenge instruction 1720, in that they are the only challenge elements that actually depict penguins.

Therefore, a correct response to the challenge instruction 1720 involves interacting with the framing image at points occupied by each of the penguins 1710-1717, and an incorrect response would be interacting with the framing image at points that are not occupied by penguins. An incorrect response would also be neglecting to interact with any one of the penguins 1710-1717 before using the Done button 1740. Marking most of the penguins 1710-1717 while failing to mark a few of them may be deemed either a correct or incorrect response, as decided by the authentication server 210.

Once the user has placed the marks 1730-1737 and uses the Done button 1740, the authentication server 210 determines whether the response is correct or incorrect.

It will also be appreciated that many other possible common objects can be depicted that also could be interacted with, and which are known to present difficult interpretation problems for computers. For example, the challenge elements could be other kinds of animal, spiralling galaxies, craters, plants, or scans from scientific instruments, and the challenge instruction can refer to such elements.

In yet another embodiment, the challenge elements may include a plurality of panels, each panel containing an image, as in a comic strip. One sequence of these panels portrays a sensible story to a typical human observer, and every other possible sequence of panels does not portray a sensible story to a typical human observer. In this scenario, the challenge instruction is to rearrange the panels to make a sensible story.

In these scenarios the challenge instruction may describe a part of the image, moving image, or three dimensional mesh for the user to select. An act of selecting an image may comprise the user indicating a point within an entire framing image. To be deemed a correct response, the indicated point, at the time it was indicated, was a distance to a correct element smaller than a distance from that point to any other element within the entire image. It will be appreciated that it requires a large amount of labour to program an agent that will inspect a large framing image to determine and enumerate the individual images composed within it that are challenge elements.

In the case of challenge images that are composed of two dimensional images, each of the challenge images may be created from a different aspect of a virtual three dimensional object, using a virtual camera to view the three dimensional object in a variety of conditions to create each two dimensional image. For example, each of the challenge images may be created from a virtual camera viewing the three dimensional object from a different angle or distance, such as facing the object's right side, facing its left side, facing its top side, and so on. In another example, some of the features of the challenge images may be altered, for example a position of its attached limbs or parts, a size or shape of features of a person or animal such as a nose, tail, ears, snout, eyes etc. In other examples, the images may be altered using virtual light sources in order to change lighting effects and shadowing, for example a warm-coloured virtual light shining on the right side of the object and a cool-coloured light shining on the left side of the object will produce an image different from a warm light above the object and a cool light below the object. In additional examples, such alterations are done in a way to make it highly labour intensive to program or train an agent to recognise that two different challenge images are derived from the same three dimensional object. In additional examples, the three dimensional object is viewed by the virtual camera within a program that runs on a server that is not the client device 220. In further examples, the three dimensional object is viewed by the virtual camera within a program that runs on the authentication server 210. It will be appreciated that one three dimensional object can be the basis for many two dimensional challenge images, each of which images comply with the challenge instruction, as evaluated by a human being.

In the case of challenge elements that contain a moving image, the virtual lights illuminating the three dimensional object may be such that a zone of light passes over an object that otherwise is completely dark, portrayed against a completely dark background, so that the whole object is never fully revealed in any one moment during the moving image. For example, the zone of light is a stripe, such as would be produced by the sun shining through a mail slot into a dark post box, and the object is passing through this stripe of light, revealing only a part of the object at any given moment of the moving image. It will be appreciated that a human has natural observational powers to assemble the multiple moments of illumination into a mental image of the entire three dimensional object. It will also be appreciated that one three dimensional object combined with a wide variety of shapes and movement patterns of the zone of light can be the basis for many different moving images, each of which images comply with the challenge instruction, as evaluated by a human being.

In the case of challenge elements that contain two dimensional challenge images, each of the challenge images may be subjected to slight random distortions which result in an image that a human would regard as largely unchanged, but require a large amount of labour to program or train an agent to recognize the similarity between the original image and the distorted image. For example, the original image can be slightly shrunken or enlarged, slightly rotated, slightly shifted up, down, right, or left, have some colour ranges slightly made brighter or darker, and have each pixel very slightly made brighter or darker in a random manner. It will be appreciated that multiple randomizing distortions can be applied to the image to produce millions of possible output images, each one not an exact duplicate of the original image.

In the case of challenge elements that are configured spatially within a single framing image, and each challenge element is an image that has been seamlessly composed into the larger framing image so that there is no visual indication of where one element stops and another begins, random selection and distortions of the individual images are done in a manner that prevents an unsophisticated agent from distinguishing one element from other elements and from the framing image. For example, each challenge image may be produced by a virtual camera viewing a virtual object, and virtual lights are shining on the object. When composing challenge images into the framing image, the authentication server must choose only images that were produced under the same configuration of virtual lights, because an unsophisticated agent can distinguish an element lit with a light from above from an element lit with a light from below. For another example, each challenge image can randomly have some colour ranges slightly made brighter or darker. When composing challenge images into the framing image, the authentication server must apply the same transformation to each challenge image, because an unsophisticated agent can distinguish an element that has been generally made lighter from an element that has generally been made darker.

Although in the authentication challenges described above the challenge elements are visual, it should be appreciated that the challenge elements may also include a number of audio components.

In one embodiment, the challenge elements may include a plurality of audio components in the form of challenge audio clips, wherein each challenge audio clip is presented sequentially to the user. At least one of the challenge audio clips is associated with a correct response to the challenge instruction, and at least one of the audio clips is associated with an incorrect response to the challenge instruction.

The authentication challenges described above may be made more computationally intensive for an agent to solve by adding random snow, noise, distortion, occlusion, decolourisation, or jitter to the challenge elements. In another example, images or sounds may be made more computationally intensive by overlapping the images or sounds.

In some embodiments one or more of the challenge elements is encrypted by the authentication server 210 before being sent to the client device 220. In another embodiment, the authentication challenge may be encrypted before being sent to the client device 220. In one embodiment, a decryption key is generated for the one or more challenge elements and/or the authentication challenge, which is sent to the client device 220 to decrypt the one or more challenge elements and/or the authentication challenge. The decryption key is sent separately to the encrypted authentication challenge. In some embodiments, a time to complete the authentication challenge is limited and predefined. For example, the time to complete the authentication challenge may be limited to ten seconds from a time that the authentication server 210 sends the decryption key to the client device 220.

In yet another embodiment, each of the challenge elements may be assigned an index identifier which is stored in a table of assigned index identifiers on the authentication server 210. When a response to the authentication challenge is received by the authentication server 210, the index identifier is compared with the table of index identifiers in order to ensure that it is valid. Each index identifier is one of a very large number of possible identifiers to reduce a likelihood of the assigned index number being predicted by an agent.

In some embodiments, a plurality of authentication challenges may be presented to the user. For example, a difficulty, i.e. a level of computation intensity, of the authentication challenges may be increased in response to the instructions of a system operator, or in automatic response to a behaviour of the user in the past. For example in the embodiment shown in FIG. 3, successive authentication challenges may include a greater number of challenge images.

In some embodiments, a reward may be awarded to the user according to a way in which the user completed the authentication challenge. For example, the shorter the amount of time to complete the authentication challenge, the higher the reward. For example, the reward may include a number of stars added to a record for the user. The user accumulates the stars with each authentication challenge. The stars may be accumulated as the user operates different client devices 220, or the same client device 220 at multiple times.

In some embodiments, the user may participate in special activities once the user has accumulated a pre-determined number of rewards. For example, if the user accumulates 100 stars, the user may choose to view marketing materials, to give a reward to a third party such as a charity or other organisation, or for the user to receive the reward.

As previously described, the present disclosure may be implemented using the system 200 of FIG. 2. However it should be appreciated that the present disclosure may also be performed on a stand-alone computing device such as a personal computer, laptop, tablet or smartphone which is not connected to the Internet.

Figure 18:
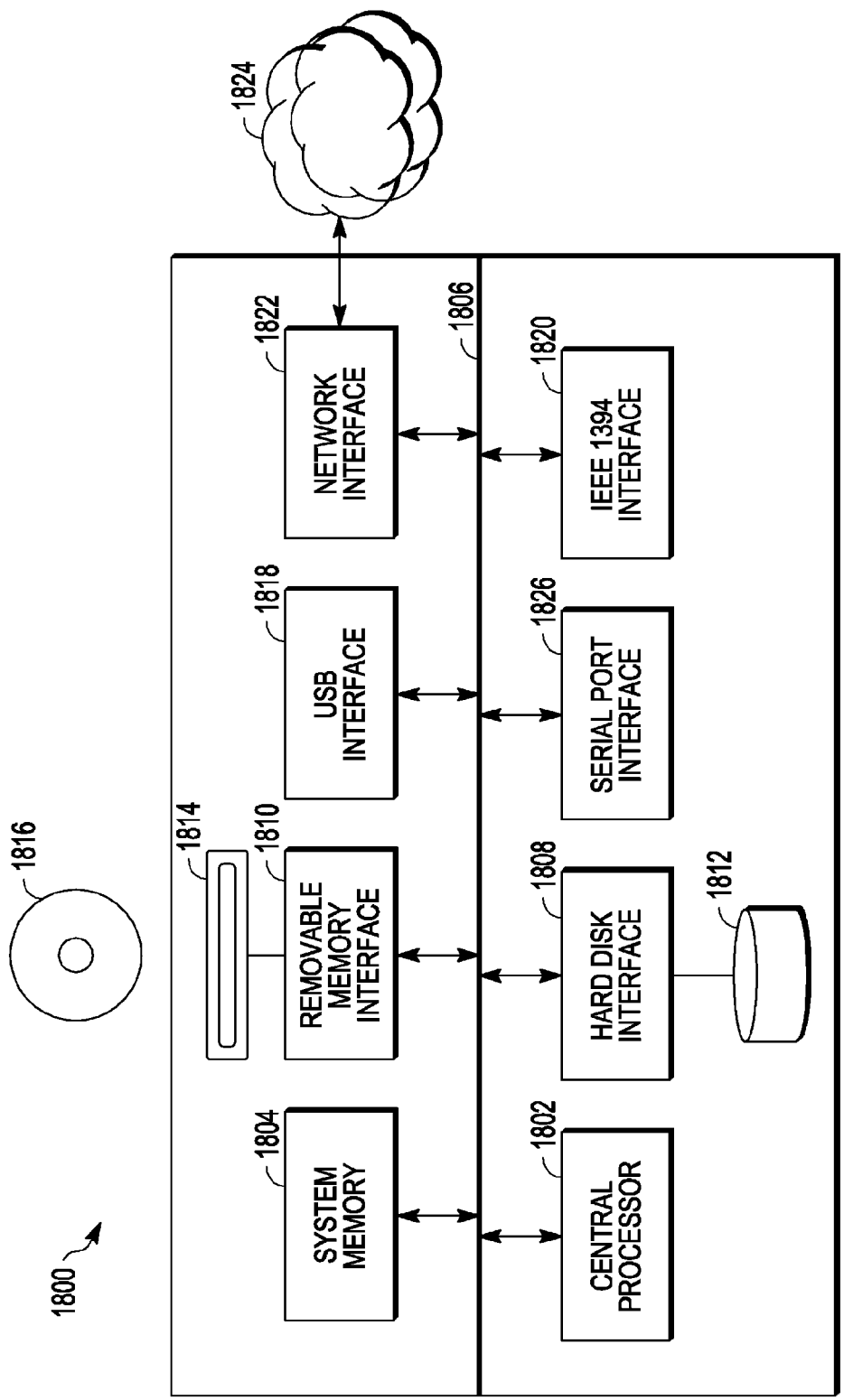
FIG. 18 diagrammatically illustrates a computing device for performing the method of the present disclosure according to an embodiment of the present disclosure.

FIG. 18 diagrammatically illustrates a computing device 1800 for performing the method of the present disclosure, such as the authentication server 210, the client device 220 or the advertising server 230, according to an embodiment of the present disclosure. Similarly, the method 100 of FIG. 1 can be implemented using the computing device 1800.

The computing device 1800 includes a central processor 1802, a system memory 1804 and a system bus 1806 that couples various system components, including coupling the system memory 1804 to the central processor 1802. The system bus 1806 may be any of several types of bus structures including a memory bus or memory controller, a peripheral bus, and a local bus using any of a variety of bus architectures. The structure of system memory 1804 is well known to those skilled in the art and may include a basic input/output system (BIOS) stored in a read only memory (ROM) and one or more program modules such as operating systems, application programs and program data stored in random access memory (RAM).

The computing device 1800 can also include a variety of interface units and drives for reading and writing data.

In particular, the computing device 1800 includes a hard disk interface 1808 and a removable memory interface 1810, respectively coupling a hard disk drive 1812 and a removable memory drive 1814 to the system bus 1806. Examples of removable memory drives 1814 include magnetic disk drives and optical disk drives. The drives and their associated computer-readable media, such as a Digital Versatile Disc (DVD) 1816 provide non-volatile storage of computer readable instructions, data structures, program modules and other data for the computer system 1800. A single hard disk drive 1812 and a single removable memory drive 1814 are shown for illustration purposes only and with the understanding that the computing device 1800 can include several similar drives. Furthermore, the computing device 1800 can include drives for interfacing with other types of computer readable media.

The computing device 1800 may include additional interfaces for connecting devices to the system bus 1806. FIG. 18 shows a universal serial bus (USB) interface 1818 which may be used to couple a device to the system bus 1806. For example, an IEEE 1394 interface 1820 may be used to couple additional devices to the computing device 1800.

The computing device 1800 can operate in a networked environment using logical connections to one or more remote computers or other devices, such as a server, a router, a network personal computer, a peer device or other common network node, a wireless telephone or wireless personal digital assistant. The computing device 1800 includes a network interface 1822 that couples the system bus 1806 to a local area network (LAN) 1824. Networking environments are commonplace in offices, enterprise-wide computer networks and home computer systems.

A wide area network (WAN), such as the Internet, also can be accessed by the computing device 1800, for example via a modem unit connected to a serial port interface 1826 or via the LAN 1824. Transmission of data can be performed using the LAN 1824, the WAN, or a combination thereof.

It will be appreciated that the network connections shown and described are exemplary and other ways of establishing a communications link between computers can be used. The existence of any of various well-known protocols, such as TCP/IP, Frame Relay, Ethernet, FTP, HTTP and the like, is presumed, and the computing device 1800 can be operated in a client-server configuration to permit a user to retrieve data from, for example, a web-based server.

The operation of the computing device 1800 can be controlled by a variety of different program modules. Examples of program modules are routines, programs, objects, components, and data structures that perform particular tasks or implement particular abstract data types. The present disclosure may also be practiced with other computer system configurations, including hand-held devices, multiprocessor systems, microprocessor-based or programmable consumer electronics, network PCs, minicomputers, mainframe computers, personal digital assistants and the like. Furthermore, the present disclosure also can be practiced with other methods of visual output from the computer system, including a virtual reality display, a projection of output into an eye of a user, a projection of output onto a surface within the view of the user, such as eyeglasses or another surface close to the eye. Furthermore, the present disclosure also can be practiced with other methods of user input to the computer system to indicate a point within the visual output at a particular time, including tapping the visual output with a finger, using keys or buttons to move an indicator across the visual output and use a key or button to indicate the moment of selection; detection of a gesture made by a limb, a digit, an eye, a head, or a body of a user, detection of a command word spoken by a user, detection of a thought by a user, or detection of a mental feature of a user's intention. Furthermore, the disclosure also can be practiced in distributed computing environments where tasks are performed by remote processing devices that are linked through a communications network. In a distributed computing environment, program modules may be located in both local and remote memory storage devices.

Advantageously, the present disclosure prevents malicious agents from accessing websites and thereby protecting both the websites and any sensitive data obtained from the website by the agent. As a result, the security of websites and sensitive data is increased.

Further advantageously, the complexity of the authentication challenges discourages hackers from designing and implementing agents due to the high labour investment.

In another particular advantage of some embodiments of the present disclosure, the authentication challenges can be altered in a way to make it highly labour intensive to program or train an agent to recognise that two different challenge images represent the same three dimensional object.

The above description of various embodiments of the present disclosure is provided for purposes of description to one of ordinary skill in the related art. It is not intended to be exhaustive or to limit the disclosure to a single disclosed embodiment. As mentioned above, numerous alternatives and variations to the present disclosure will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present disclosure that have been discussed herein, and other embodiments that fall within the spirit and scope of the above described disclosure.

The invention claimed is:

1. A method for user authentication, the method comprising:
    presenting an authentication challenge to a user of a computing device, the authentication challenge including a number of challenge elements;
    receiving a response to the authentication challenge from the user, the response including a selection of one or more challenge elements in accordance with an instruction to the user on how to complete the authentication challenge, wherein any challenge element that complies with the instruction comprises a visual indication of compliance, the visual indication of compliance comprising a portion of the challenge element that is selectable by the user as a correct response to the authentication challenge;
    notifying the user whether the selection of the one or more challenge elements correctly complied with the instruction; and
    responsive to the selection of the one or more challenge elements correctly complying with the instruction, allowing the user to perform a computer operation,
    wherein any challenge element that fails to comply with the instruction comprises a visual indication of non-compliance, the visual indication of non-compliance comprising a portion of the challenge element that is selectable by the user as an incorrect response to the authentication challenge,
    wherein the visual indication of compliance comprises a first image having a first visual property and a second image having a second visual property, the first image positioned relative to the second image, and
    wherein the instruction comprises a word referring to a material, the visual indication of compliance portrays a first object made of the material named in the instruction, and the visual indication of non-compliance portrays a second object made of another material different than the material named in the instruction.

2. The method of claim 1, wherein the instruction further comprises a word referring to a shape, the visual indication of compliance portrays both the shape named in the instruction and the material named in the instruction, and the visual indication of non-compliance portrays another shape different than the shape named in the instruction.

3. The method of claim 1, wherein the instruction further comprises a word referring to a relative size property, the visual indication of compliance portrays both the relative size property named in the instruction and the material named in the instruction, and the visual indication of non-compliance portrays another property different than the relative size property named in the instruction.

4. The method of claim 1, wherein the instruction further comprises a position relative to another image, and the visual indication of compliance is both in the position named in the instruction and of the material named in the instruction, and the visual indication of non-compliance is not in the position named in the instruction.

5. A method for user authentication, the method comprising:
    presenting an authentication challenge to a user of a computing device, the authentication challenge including a number of challenge elements;
    receiving a response to the authentication challenge from the user, the response including a selection of one or more challenge elements in accordance with an instruction to the user on how to complete the authentication challenge, wherein any challenge element that complies with the instruction comprises a visual indication of compliance, the visual indication of compliance comprising a portion of the challenge element that is selectable by the user as a correct response to the authentication challenge;

notifying the user whether the selection of the one or more challenge elements correctly complied with the instruction; and responsive to the selection of the one or more challenge elements correctly complying with the instruction, allowing the user to perform a computer operation, wherein the visual indication of compliance comprises a moving image that portrays one or more avatars, and wherein at least one avatar is performing an activity, and wherein each avatar in the moving image is rendered from a three-dimensional virtual object, and some of features of each three-dimensional virtual object are altered by one of a plurality of animations of the three-dimensional virtual object in a way that distorts a polygonal mesh of the three-dimensional virtual object over time.

6. The method of claim 5, wherein the moving image portrays a person performing an action that is commonly regarded in criminal law as illegal.

7. The method of claim 1, wherein the visual indication of compliance comprises a simulated image of a class of natural phenomenon, the simulated image classifiable by human skill.

8. The method of claim 7, wherein the instruction comprises a reference image, and the instruction instructs the user to select an image that portrays a same phenomenon shown in the reference image, and wherein a framing image contains multiple challenge elements within it, and, within the framing image, a correct challenge element that complies with the instruction portrays, by visual simulation, a natural phenomenon.

9. The method of claim 1, wherein a time to complete the authentication challenge is limited and predefined.

10. The method of claim 1, further comprising presenting a plurality of authentication challenges to the user, each authentication challenge being presented in sequence.

11. The method of claim 1, wherein the challenge elements include at least one of a plurality of visual components, a plurality of audio components, or a plurality of audio-visual components.

12. The method of claim 1, wherein the instruction comprises a direction for the user to move one or more of the challenge elements in such a way to make the one or more of the challenge elements go up, down, left, right, in, out, or to rotate around an axis.

13. The method of claim 5, wherein any challenge element that fails to comply with the instruction comprises a visual indication of non-compliance, the visual indication of non-compliance comprising a portion of the challenge element that is selectable by the user as an incorrect response to the authentication challenge.

14. The method of claim 13, wherein the visual indication of compliance comprises a compliance image portraying an object that appears to be orientated upright.

15. The method of claim 14, wherein the compliance image portrays multiple images in a stack, so that each image overlays another image so that the images are overlapping.

16. The method of claim 14, wherein the visual indication of non-compliance comprises a non-compliance image comprising the object in a position other than upright.

17. The method of claim 5, wherein the at least one avatar is moving through an area crowded with other objects, and at times the other objects occlude or are occluded by each other, and at other times the other objects appear to move into and out of areas of different light intensity.

18. The method of claim 5, wherein a time to complete the authentication challenge is limited and predefined.

19. The method of claim 5, further comprising presenting a plurality of authentication challenges to the user, each authentication challenge being presented in sequence.

20. The method of claim 5, wherein the challenge elements include at least one of a plurality of visual components, a plurality of audio components, or a plurality of audio-visual components.

* * * * *